United States Patent
Nanjo

(10) Patent No.: US 6,296,963 B1
(45) Date of Patent: Oct. 2, 2001

(54) SOLID OXIDE ELECTROLYTE FUEL CELL

(75) Inventor: Fusayuki Nanjo, Kobe (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/341,530

(22) PCT Filed: Nov. 13, 1998

(86) PCT No.: PCT/JP98/05104

§ 371 Date: Jul. 13, 2000

§ 102(e) Date: Jul. 13, 2000

(87) PCT Pub. No.: WO99/26304

PCT Pub. Date: May 27, 1999

(30) Foreign Application Priority Data

Nov. 14, 1997 (JP) .................................................. 9-313244

(51) Int. Cl.[7] ...................................................... H01M 2/14
(52) U.S. Cl. .............................. 429/38; 429/39; 429/34; 429/30
(58) Field of Search ................................ 429/30, 34, 38, 429/39, 35, 17

(56) References Cited

U.S. PATENT DOCUMENTS

| | | | |
|---|---|---|---|
| 4,857,420 | * 8/1989 | Maricle et al. | 429/30 |
| 5,882,809 | * 3/1999 | McPheeters et al. | 429/30 |
| 5,935,727 | * 8/1999 | Chiao | 429/32 |
| 5,942,349 | * 8/1999 | Badwal et al. | 429/34 |
| 5,993,986 | * 11/1999 | Wallin et al. | 429/32 |
| 6,051,330 | * 4/2000 | Fasano et al. | 429/30 |

FOREIGN PATENT DOCUMENTS

| | | |
|---|---|---|
| 62-97267A | 5/1987 | (JP) . |
| 3-98268A | 4/1991 | (JP) . |
| 6-196195A | 7/1994 | (JP) . |
| 6-275305A | 9/1994 | (JP) . |
| 8-138694A | 5/1996 | (JP) . |

* cited by examiner

Primary Examiner—Gabrielle Brouillette
Assistant Examiner—R Alejandro

(57) ABSTRACT

A planar type solid oxide electrolyte fuel cell which is composed of power generation films in which an oxygen electrode is constituted on one side of each solid electrolyte having dimples almost all over its surface and a fuel electrode on the other side thereof, interconnectors sandwiched between the said power generation films, and seal materials which surround the four sides of the said power generation films, wherein oxidant gases and fuel gases react electrochemically via the said power generation films in order to obtain electric energy, wherein on the fuel electrode side of one the four sides of the cell a fuel inlet aperture is provided over nearly the entire length thereof, and a fuel outlet aperture is provided on the side facing the said one side over nearly the entire length thereof, and an air inlet aperture is provided on the oxygen electrode side of one of the remaining two sides, the said air inlet aperture being located in that half of the said side which is closer to the fuel gas inlet aperture, and an air outlet aperture is provided on the side facing the said air inlet aperture, the said air outlet aperture being located in about that half the said side which is closer to the fuel outlet aperture.

14 Claims, 25 Drawing Sheets

SECTION X-X IN FIG.1

SCHEMATIC VIEW OF POWER GENERATION FILM 2a
Fig. 3 (a)
SECTION X-X IN (c)
Fig. 3 (b)
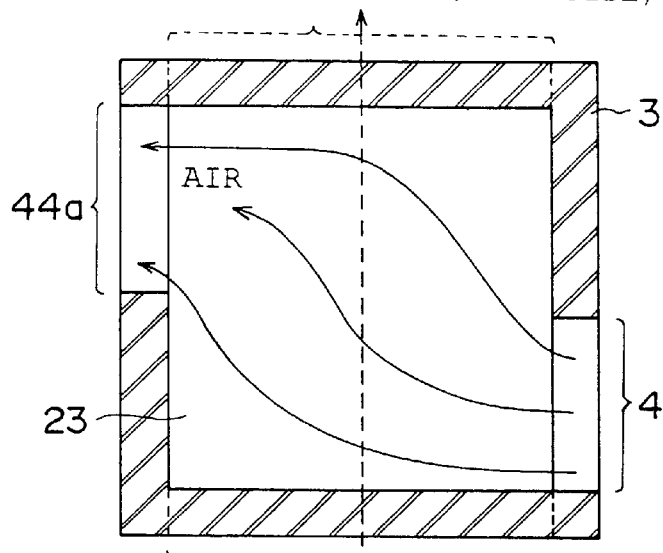
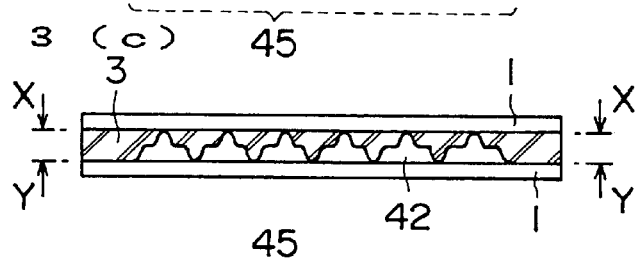
Fig. 3 (c)
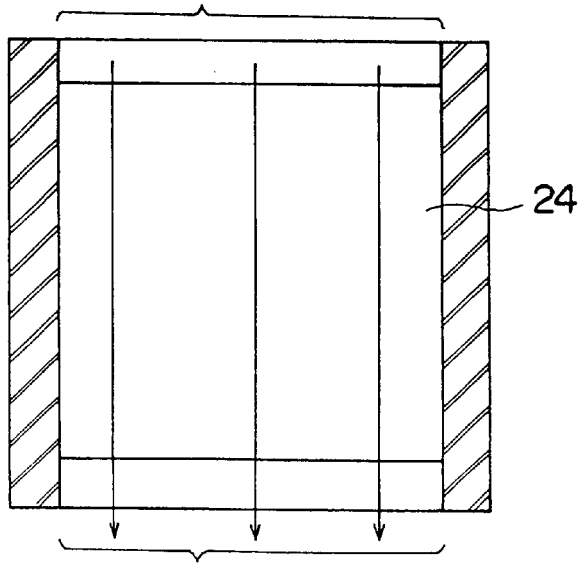
Fig. 3 (d)
SECTION Y-Y IN (c)

SCHEMATIC VIEW OF POWER GENERATION FILM 2b
Fig. 4 (a)
Fig. 4 (b) SECTION X-X IN (c)
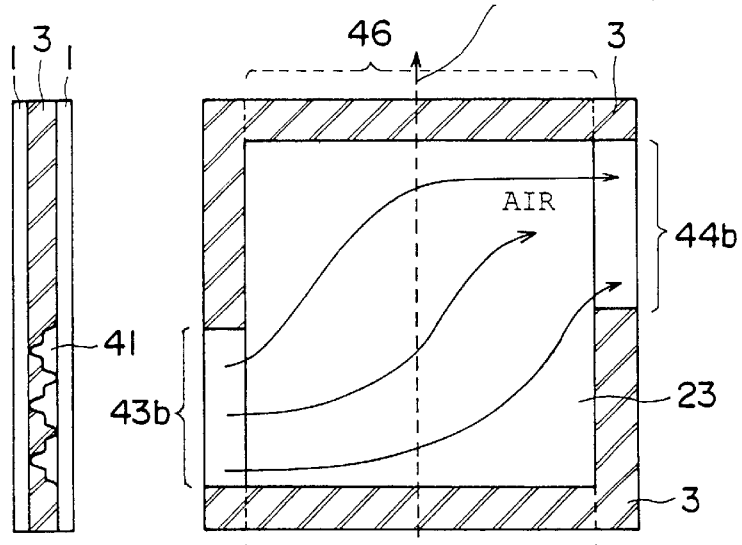
Fig. 4 (c)
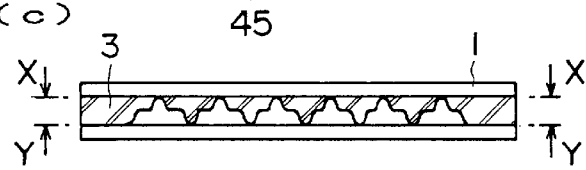
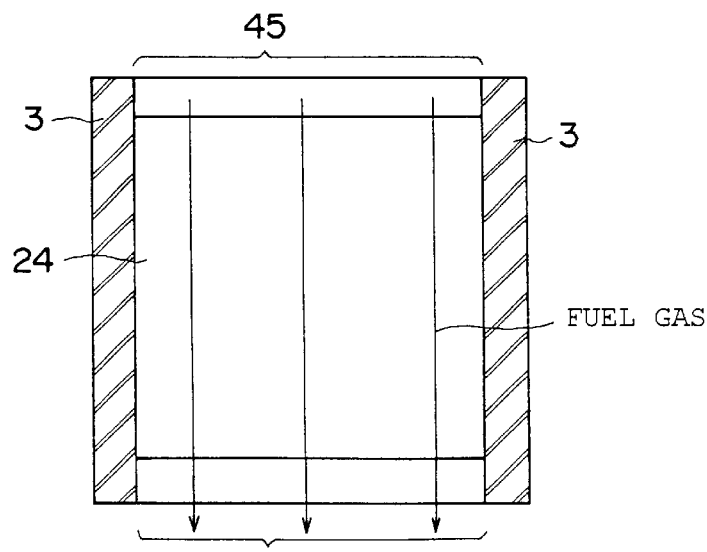
Fig. 4 (d) SECTION Y-Y IN (c)

Fig. 8 (a) SECTION A-A IN FIG.7
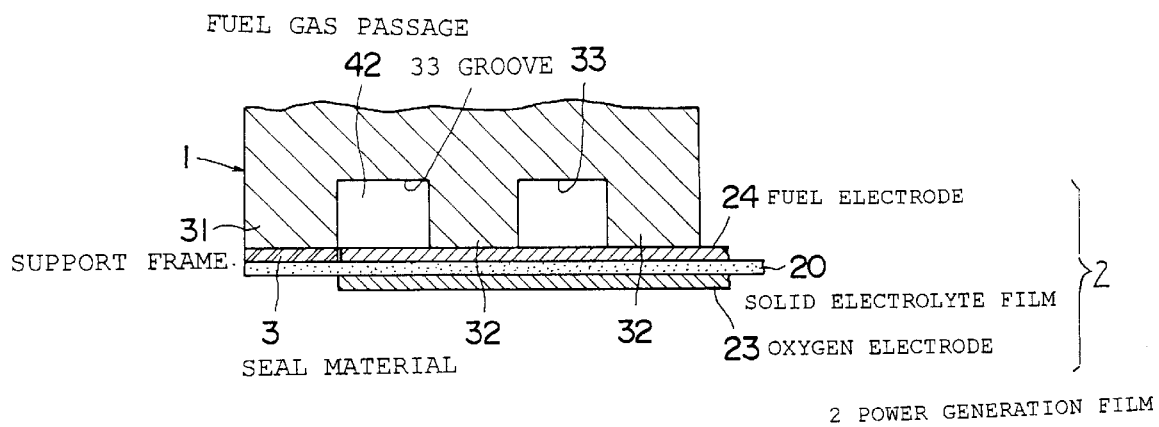
Fig. 8 (b) SECTION Y-Y IN FIG.7
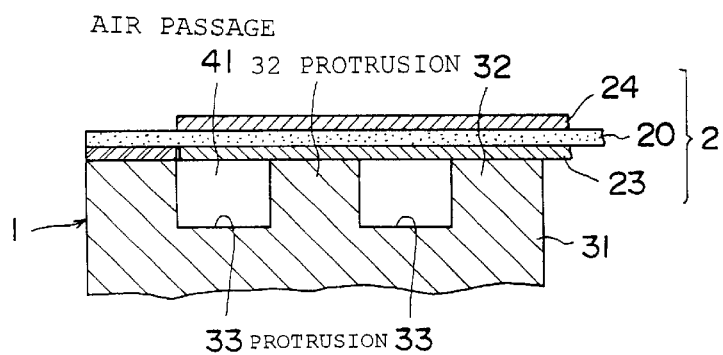

SCHEMATIC VIEW OF INTERCONNECTOR 1a
Fig. 9 (a) SECTION X-X IN (c)
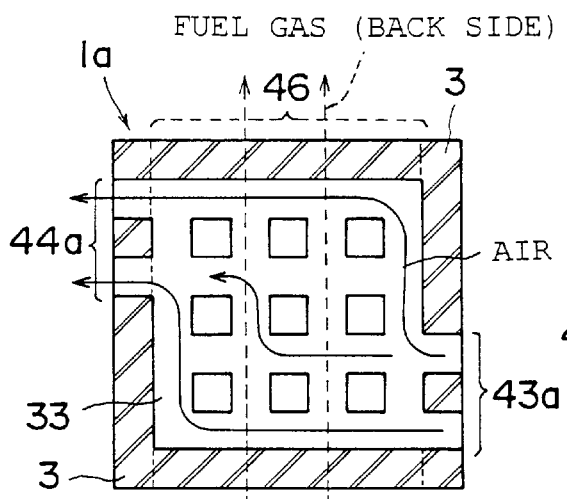
Fig. 9 (b)
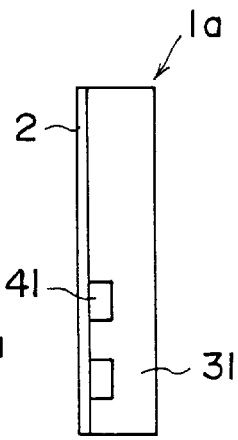
Fig. 9 (c)
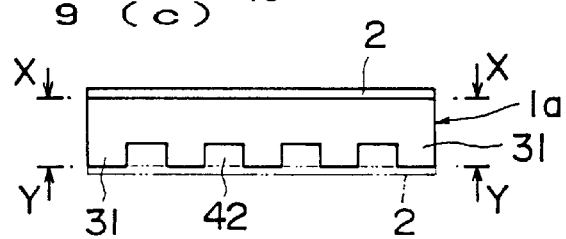
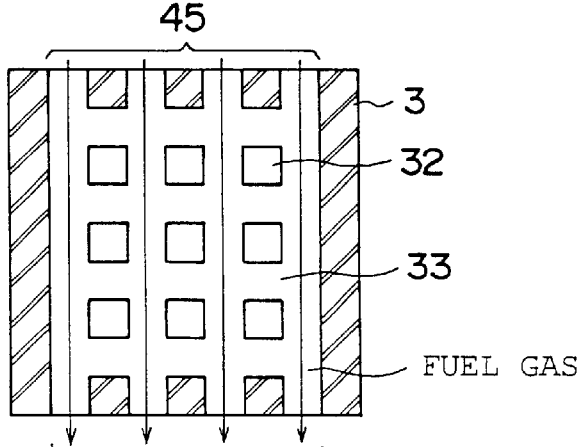
Fig. 9 (d) SECTION Y-Y IN (c)

SCHEMATIC VIEW OF INTERCONNECTOR 1b
Fig. 10 (a)
Fig. 10 (b) SECTION X-X IN (c)
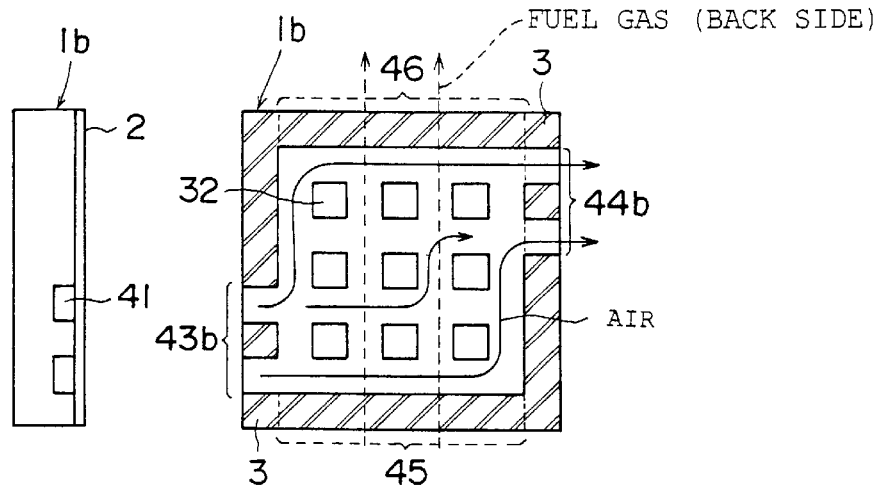
Fig. 10 (c)
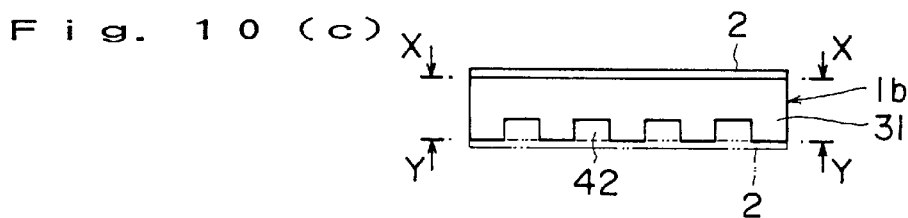
Fig. 10 (d) SECTION Y-Y IN (c)
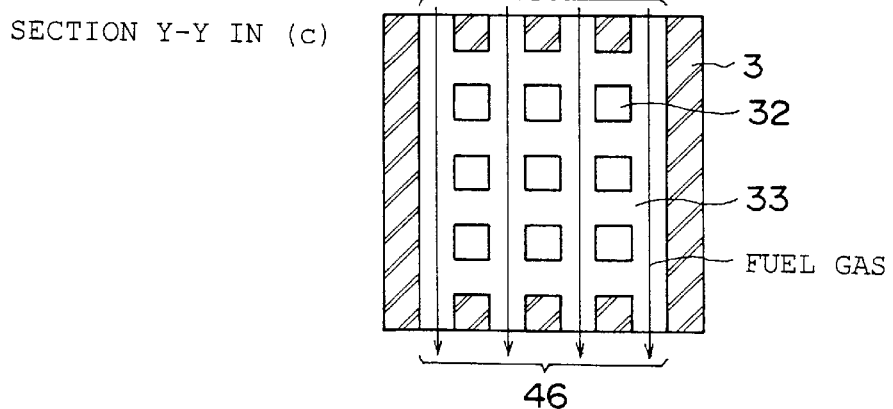

SECTION X-X IN FIG.11

SCHEMATIC VIEW OF POWER GENERATION FILM 2a (a) SECTION X-X IN (b)

SECTION Z-Z IN (a)

SECTION Y-Y IN (b)

SCHEMATIC VIEW OF POWER GENERATION FILM 2b
Fig. 14 (a) SECTION X-X IN (b)
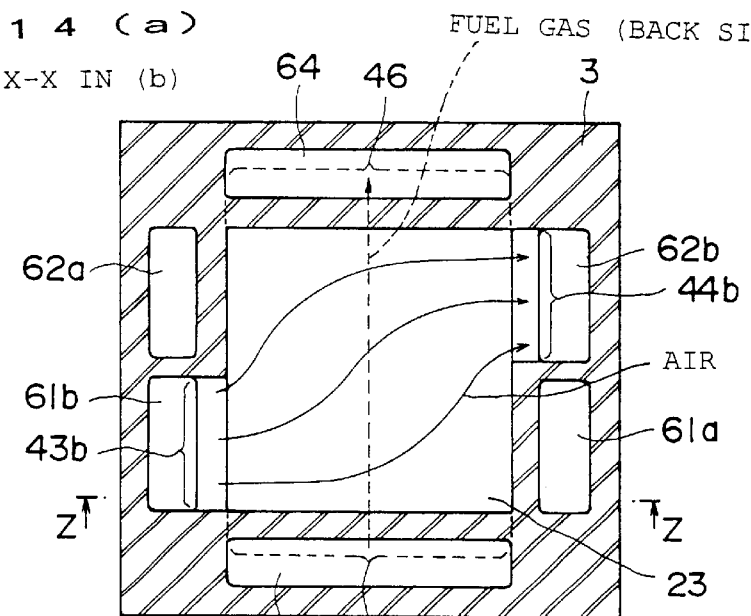
Fig. 14 (b) SECTION Z-Z IN (a)
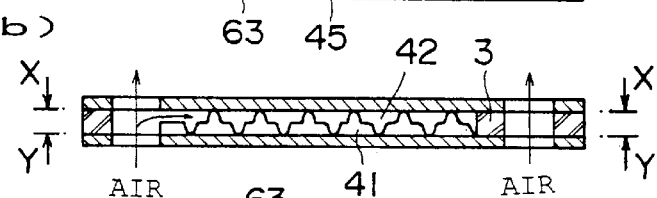
Fig. 14 (c) SECTION Y-Y IN (b)
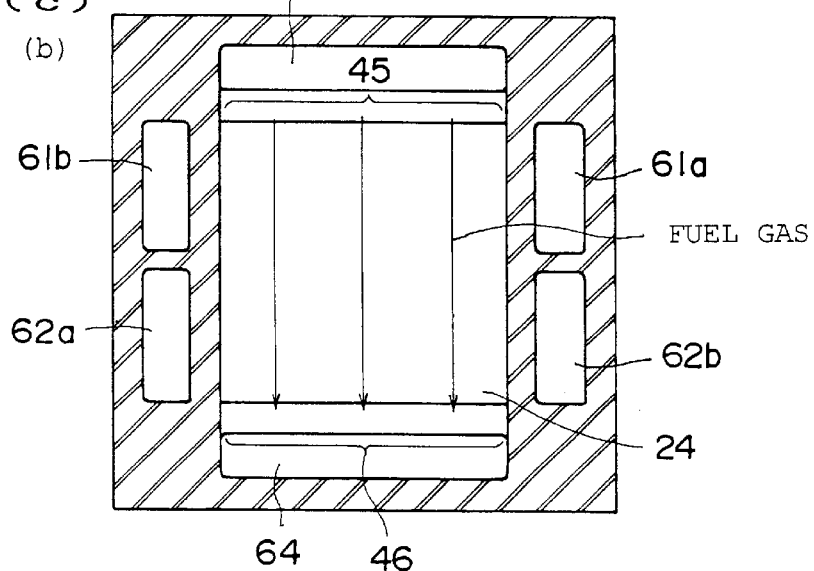

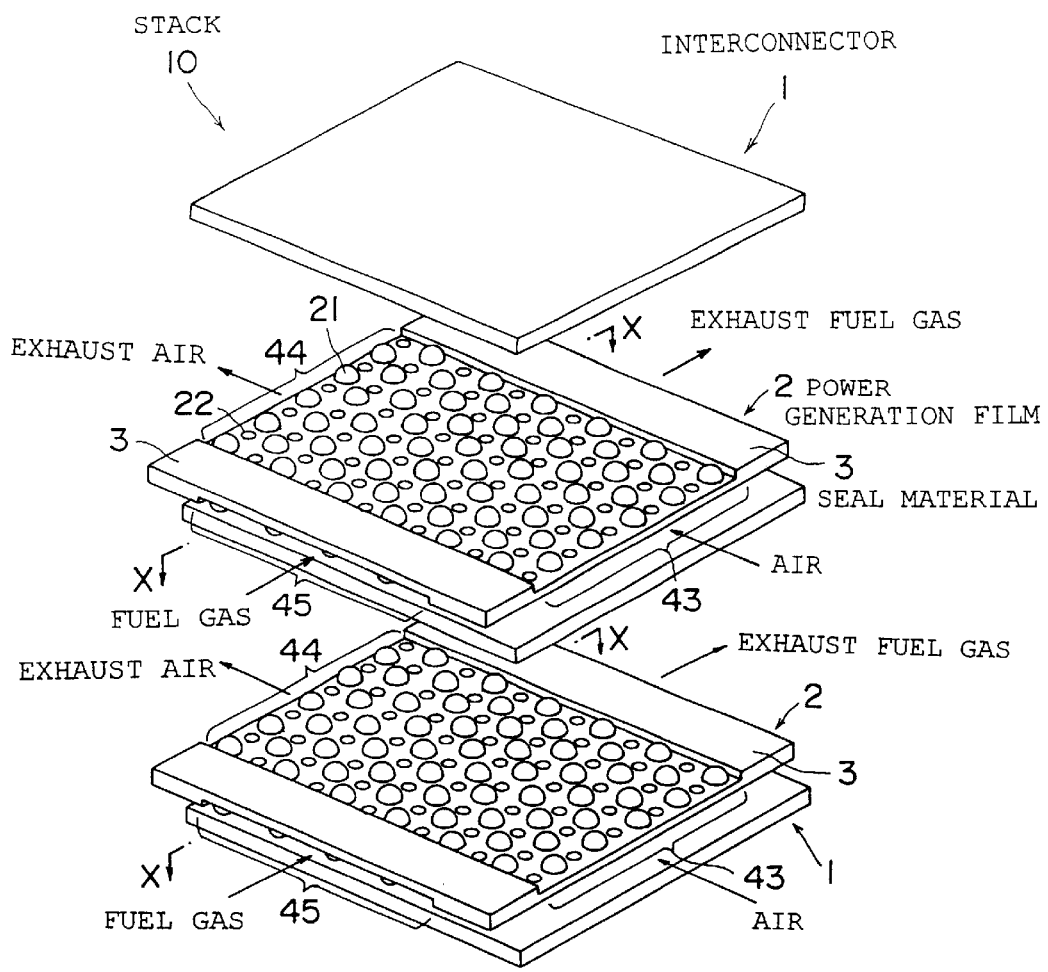
Fig. 1 5 (Prior Art)

SECTION X-X IN FIG.15

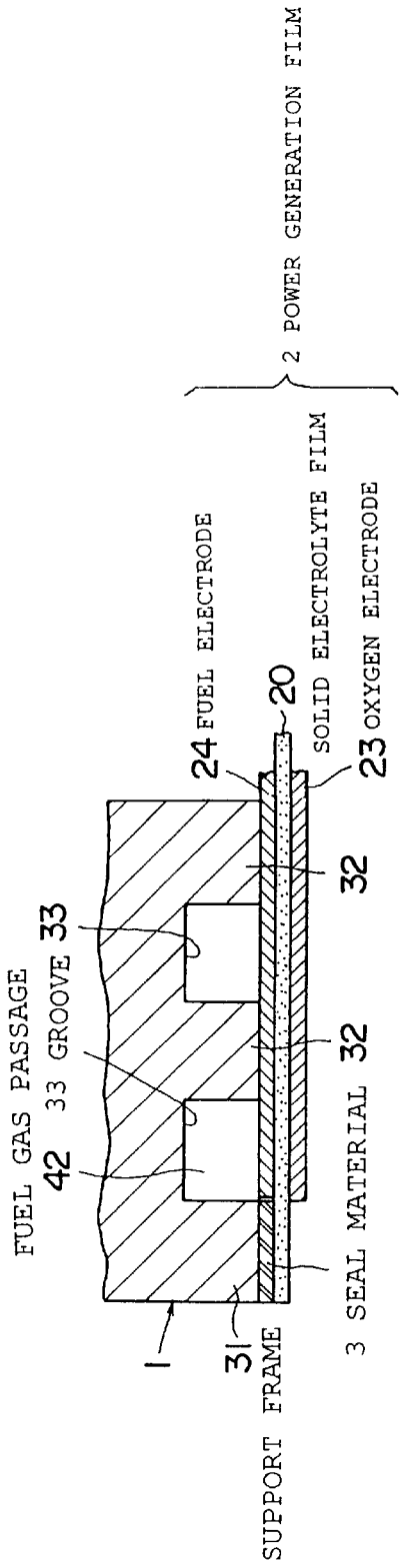
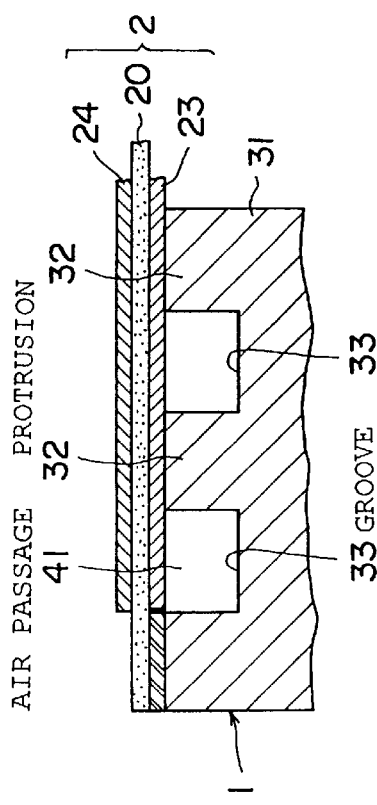

ISOTHERMAL DIAGRAM : CROSS FLOW TYPE

ISOTHERMAL DIAGRAM : CO-FLOW TYPE

SECTION X-X IN (b)

SECTION Y-Y IN (b)

Fig. 22 (a) SECTION X-X IN (b)
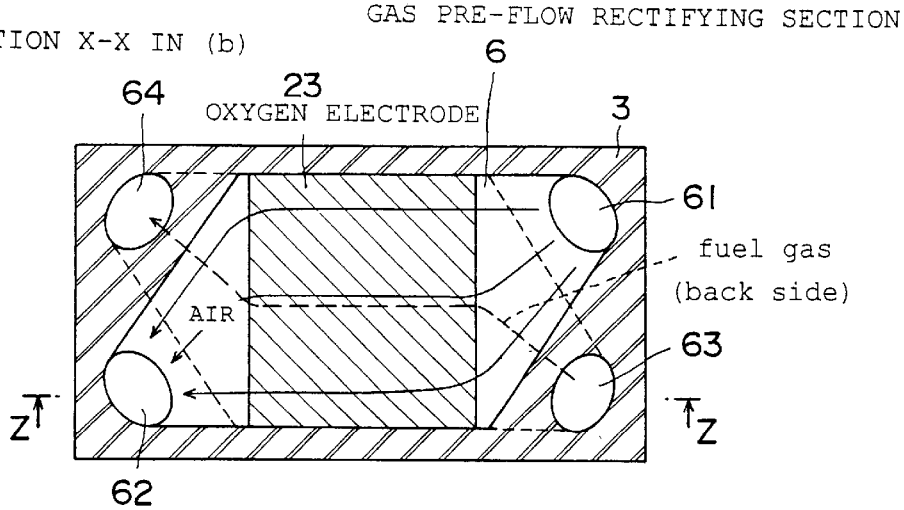
Fig. 22 (b) SECTION Z-Z IN (a)
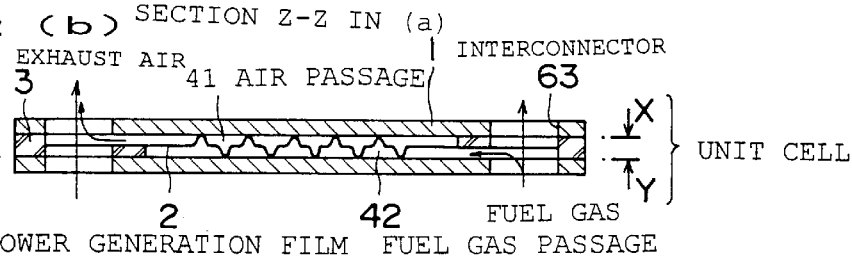
Fig. 22 (c) SECTION Y-Y IN (b)
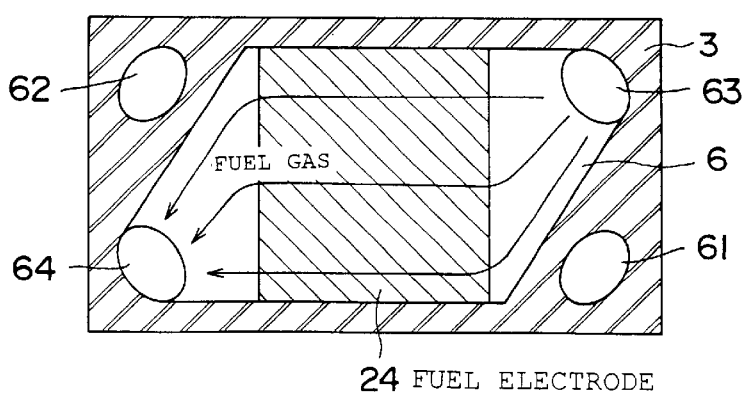

SECTION B-B

SOLID OXIDE ELECTROLYTE FUEL CELL

This application is the national phase under 35 U.S.C. § 371 of PCT International Application No. PCT/JP98/05104 which has an International filing date of Nov. 13, 1998, which designated the United States of America.

BACKGROUND OF THE INVENTION

1. Technical Field

The present invention relates to a compact and economical solid oxide electrolyte fuel cell which comprises a simple structure to provide a large power generation area, and the thermal stress generated therein is low to ensure reliable fuel cell characteristics.

2. Background Technology

Conventionally, as a planar type solid oxide electrolyte fuel cell (hereinafter SOFC) in which power generation films comprise a dimpled structure (hereinafter "dimples"), the configuration shown in FIGS. 15 and 16 is known.

FIG. 15 is an exploded perspective view of the SOFC and FIG. 16 is a sectional view taken along line X—X in FIG. 15. In these figures, reference numeral 1 denotes an interconnector (also called a gas separator); 2, a power generation film, which together with the interconnector 1 constitute a unified fuel cell structure 10 (hereinafter "stack") in such a manner that from top to bottom an interconnector 1, a power generation film 2, an interconnector 1, and so on, are alternately superposed.

The power generation film 2 is the smallest unit cell (also called a cell) that constitutes a SDFC, and is mainly composed of a solid electrolyte film 20 comprising convex dimples 21 and concave dimples 22 substantially all over its surfaces, an oxygen electrode 23 on one side of the solid electrolyte film 20, and a fuel electrode 24 on the other side thereof.

In the SOFC shown in FIGS. 15 and 16, the side having convex dimples 21 is the oxygen electrode 23 and the side having concave dimples serves as the fuel electrode 24. The above power generation film 2 is surrounded by a seal material 3 in the circumference thereof, except for gas inlet and outlet apertures through which oxidant gases (e.g. air, hereinafter air) and fuel gases pass, and each film is sandwiched between two interconnectors 1 to form air flow passages 41 and fuel gas flow passages 42.

The above interconnectors 1, on the other hand, are connected with the seal material 3 to provide space between themselves and the adjacent power generation film 2 and constitute gas flow passages, while providing electrical functions for series connection by contacting or connecting with the dimple protrusions of the adjacent power generation films.

The SOFC stack 10 thus constituted is then kept in a high temperature range of 800° C.~1000° C., and power is generated when air flows through the air passages 41 and a fuel gas through the gas passages 42, respectively, as illustrated in FIGS. 15 and 16.

In the example in FIG. 15, the air flow and the fuel gas flow are perpendicular to each other on the top and the bottom side of each power generation film 2. For this reason, a SOFC having this kind of gas flow layout is generally called a cross flow type.

In the cross flow type shown in FIG. 15, an air inlet 43 is provided on one of the four sides of each planar type cell and an air outlet 44 is constituted on the opposite side thereof, whereas a fuel gas inlet 45 is given on one of the remaining sides and a fuel outlet (not shown) is prepared on the facing side thereof.

On the other hand, there is a planar cross flow type SOFC, in which each power generation film 2 is a flat plate without any dimple and grooves are provided in the interconectors 1 to constitute gas flow passages. A typical example of this configuration is shown in FIGS. 17 and 18.

FIG. 17 is an exploded perspective view of the said SOFC; FIGS. 18(a) and 18(b) are sectional views taken along line X—X and line Y—Y in FIG. 17, respectively Each power generation film 2 is a flat plate without any dimple, and is composed of a solid electrolyte film 20, an oxygen electrode 23 on one side of the power generation film 20, and a fuel electrode 24 on the other side thereof in FIG. 18.

In FIG. 17, reference numeral 1 denotes an intermediate interconnector on both sides of which multiple rows of grooves 33 for gas flow are provided along the direction of gas flow. Reference numerals 1c and 1d in the same figure indicate an upper interconnector and a lower interconnector of the stack 11, respectively. On the surface facing a power generation film 2 of each of these interconnectors, multiple grooves 33 are provided along the direction of gas flow, and the opposite surface thereof is usually flat to fit power collecting parts for taking out electric current. The interconnectors 1, the upper interconnector 1c, and the lower interconnector 1d alternately isolate the power generation films 2, thereby forming air flow passages 41 and fuel gas flow passages 42 between themselves and the adjacent power generation films 2, and having at the same time functions for electrical series connection by contacting or connecting with the protrusions 32 of the interconnectors and the oxygen electrodes 23 as well as the fuel electrodes 24 of the adjacent power generation films.

In FIG. 17, the SOFC stack 11 is composed of an upper interconnctor 1c, a power generation film 2, an intermediate interconnctor 1, a power generation film 2, . . . , a lower interconnector 1d, which are superposed alternately from top to bottom, thus constituting a unified structure. The stack 11 is then kept in a temperature range of 800° C.~1000° C., and power is generated, as shown in FIG. 18, by letting air flow through the air flow passages 41 and a fuel gas through the fuel gas flow passages 42.

In a SOFC, the operation temperature is as high as 800° C.~1000° C., and the reaction in the fuel cell generates heat. As a result, the temperature distribution in the fuel cell is such that the area near the gas inlet is in a low temperature range and the area near the gas outlet is in a high temperature range. In the SOFC's as shown in FIGS. 15~18 in which the gas flow occurs according to the cross flow method, a temperature distribution as shown in FIG. 20(a) is observed. The % values in FIG. 20(a) indicate approximate ratios when the temperature difference between the gas inlet and the gas outlet is regarded as 100%. Once such a temperature distribution occurs, thermal stress is generated in each part of the fuel cell. If the thermal stress becomes too high, the heat build-up associated with the cell reaction increases by taking out much output, for example, and an excessive temperature difference between the gas inlet and the gas outlet results in a higher thermal stress, thus causing the electrical connection between the stacked cells to deteriorate partially, or damaging the surrounding gas seal parts to cause a decrease in power generation capability, which in some cases could lead to fractures of the interconnectors or the power generation films. In such cases, the expected power output cannot be obtained and the function as a fuel cell itself may be lost.

One of the means to avoid such trouble is to decrease the temperature difference between the gas inlet and the gas outlet of the fuel cell by providing much air to remove the reaction heat of the cell, thus maintaining reliable characteristics of the fuel cell.

However, such a method requires high ventilating power to send a large volume of air, as well as a large-sized heat exchanger or heater in order to preheat the large volume of air up to a temperature close to the operating temperature of the SOFC. As a result, the fuel cell becomes uneconomical as a power generation unit.

On the other hand, as a structural means to solve the above problem, there is the so-called co-flow method by which the air and the fuel gas flow parallel to each other in the same direction.

A typical example which employs this method is shown in FIGS. 21 and 22. In these figures, reference numeral 5 denotes a header; 6, a gas pre-flow rectifying section. Both 5 and 6 are provided as rectifying sections for the air or the fuel gas to flow uniformly in one direction. The other reference numerals are the same as those explained in FIGS. 15, 16 and 17, 18.

In the SOFC illustrated in FIGS. 21 and 22, in which the co-flow method is employed, a temperature distribution as shown in FIG. 20(*b*) is observed. In such a fuel cell, the temperature increases gradually from -he gas inlet toward the gas outlet of the cell, enabling relatively free thermal expansion with small self-constraint. As a result, the thermal stress caused by the heat build-up in the cell becomes also small. In summary, under the same condition, the heat distribution that occurs in the cell of the co-flow type shown in FIG. 20(*b*) results in lower thermal stress than in the cell of the cross flow type in FIG. 20(*a*), thus improving the fuel cell characteristics and providing full performance of the fuel cell.

By the co-flow method, however, it is necessary to prepare two kinds of gas inlet apertures 43, 45 for air and fuel gases, respectively, or outlet apertures 44, 64 on one of the four sides of the planar fuel cell, which requires a more complicated manifold structure for gas inlet and outlet. As a result, the co-flow method becomes inferior to the cross flow method in terms of reliability and economy.

In order to obtain the temperature distribution as shown in FIG. 20(*b*), it is also necessary to let the gases flow uniformly in one direction. To realize this goal, the header 5 as shown in FIG. 21 or the gas pre-flow rectifying section 6 as shown in FIG. 22 has been invented. For a uniform gas flow, the header (reference numeral 5 in FIG. 21) and the gas pre-flow rectifying section (reference numeral 6 in FIG. 22) need to be wide enough, which does not actually contribute to the power generation itself, resulting in a relative decrease in the effective power generation area of the fuel cell (i.e. in the power generation film in FIGS. 21 or 22, the area contributing to the power generation is only the hatched part that comprises the oxygen electrode 23 on one side and the fuel electrode 24 on the other side). As a result, the fuel cell becomes larger in order to obtain a desired power output, and less economical as compared with the cross flow method.

As explained above, by -he cross flow method, each of the air flow and the fuel gas flow are almost uniform in one direction, and the cell reaction is efficient by using nearly the entire surface of the power generation film, whereas high thermal stress occurs, which may lead to unreliable cell characteristics. By the co-flow method, on the other hand, less thermal stress occurs, and therefore better cell characteristics can be obtained as compared with the cross flow method. However, a header or a gas pre-flow rectifying section which does not contribute to power generation becomes necessary in order to realize an ideally uniform parallel gas flow in one direction for a sufficient cell performance, thus inevitably requiring a larger fuel cell area to obtain a desired power output, which makes the co-flow method less economical. For this reason, required is a fuel cell structure which compensates the disadvantages of both of the above-mentioned gas flow methods.

In view of the above problems, an object of the present invention is to provide a compact and economical SOFC in which the thermal stress is low to realize reliable cell characteristics and the structure is simple to ensure a wide power generation area as is the case with a SOFC by the cross flow method.

DISCLOSURE OF THE INVENTION

The first claim of the present invention that attains the above object is realized in a planar type SOFC which comprises a power generation film or a plurality of power generation films, each having an oxygen electrode on one side and a fuel electrode on the other side thereof, interconnectors sandwiching the said power generation film(s), and a seal material surrounding the four sides of the said power generation film(s), wherein electric energy is obtained by reacting an oxidant gas with a fuel gas electrochemically via the said power generation film(s). In the said SOFC, a fuel gas inlet aperture is provided over nearly the entire length of one of the four sides of each cell, the said side being on the fuel electrode side of the cell, and a fuel outlet aperture is provided over nearly the entire length of the opposite side thereof, whereas an air inlet aperture is provided on one of the remaining two sides thereof, the said air inlet aperture being located on the oxygen electrode side and in that half of the side which is closer to the gas outlet aperture, and an air outlet aperture is provided on the side facing the said air inlet aperture, the said air outlet aperture being located in that half of the said side which is closer to the fuel gas outlet aperture.

Such an embodiment provides a compact and economical SOFC in which the thermal stress is low to realize reliable cell characteristics and the structure is simple to ensure a large power generation area.

The second claim of the present invention is a planar type SOFC as in the first claim, wherein each of the said power generation films is a solid electrolyte which comprises dimples over nearly the entire surface thereof, having an oxygen electrode on one side and a fuel electrode on the other side thereof.

The third claim of the present invention is a planar type SOFC as in the second claim, wherein the air inlet aperture constitutes a cell on the right side of the fuel gas inlet aperture and another cell on the left side thereof, the said cells being superposed alternately via interconnectors for electrical series connection in a unified structure.

The fourth claim is a planar type FOFC as in the second claim of the invention, which comprises multiple layers of said interconnectors and said power generation films arranged next to one another, wherein the fuel gas outlet aperture faces upwards and the fuel gas inlet aperture faces downwards.

The fifth claim is a planar type SOFC as in the second claim, wherein the said fuel gas side and the said air side are replaced completely with each other.

The sixth claim is a planar type SOFC as in the first claim, wherein each of the said power generation films is a rectangular planar solid electrolyte which comprises a fuel electrode on one side and an oxygen electrode on the other side thereof, and grooves for gas flow are provided on both sides of each interconnector so that fuel gases or oxidant gases can be supplied to each electrode side of the adjacent power generation films, whereas the four surrounding sides of each interconnector, except the gas inlet and the gas outlet, comprise a flat-surfaced support frame to support the adjacent power generation film(s) as well as to insulate gases, and a fuel gas and air react electrochemically via the said power generation films in order to take out electrical energy.

The seventh claim is a planar type SOFC as in the sixth claim of the invention, wherein the air inlet aperture forms a cell located on the right side of the fuel gas inlet aperture and another cell situated on the left side thereof, and the interconnectors and the power generation films are superposed alternately for electrical series connection in a unified structure.

The eighth claim is a planar type SOFC as in the sixth claim, wherein the said interconnectors and the said power generation films are superposed in such a manner that the fuel gas outlet faces upwards and the fuel gas inlet faces downwards.

The ninth claim is a planar type FCFC as in the sixth claim of the invention, wherein the said gas fuel side and the said air side are replaced completely with each other.

The tenth claim is a planar type SOFC as in the second or the sixth claim of the invention, wherein the entire gas supply manifold or a part thereof is constituted as an internal manifold system.

BRIEF DESCRIPTION OF THE DRAWINGS

FIG. 3(c) is a schematic front view of the power generation film 2a of the first embodiment, FIG. 3(a) is a cross-sectional view of the film 2a taken along line X—X in FIG. 3(c), FIG. 3(b) is a right side view of the film 2a, and FIG. 3(d) is a cross-sectional view of the file 2a taken along line Y—Y in FIG. 3(c);

FIG. 4(c) is a schematic front view of the power generation film 2b of the first embodiment, FIG. 4(a) is a cross-sectional view of the film 2b taken along line X—X in FIG. 4(c), FIG. 4(b) is a left side view of the film 2b, and FIG. 4(d) is a cross-sectional view of the file 2b taken along line Y—Y in FIG. 4(c);

FIG. 8(a) is a sectional view taken along line X—X, and FIG. 8(b) is a sectional view taken along line Y—Y in FIG. 7, respectively;

FIG. 9(c) is a schematic front view of the intermediate interconnector 1a in the second embodiment, FIG. 9(a) is a cross-sectional view of the interconnector 1a taken along line X—X in FIG. 9(c), FIG. 9(b) is a right side view of the interconnector 1a, and FIG. 9(d) is a cross-sectional view of the interconnector 1a taken along line Y—Y in FIG. 9(c);

FIG. 10(c) is a schematic front view of the interconnector 1b in the second embodiment, FIG. 10(a) is a cross-sectional view of the interconnector 1b taken along line X—X in FIG. 10(c), FIG. 10(b) is a right side view of the interconnector 1b, and FIG. 10(d) is a cross-sectional view of the interconnector 1b taken along line Y—Y in FIG. 10(c);

FIG. 14(b) is a schematic front view of the power generation film 2b in the second embodiment, FIG. 10(a) is a cross-sectional view of the film 2b taken along line X—X in FIG. 14(b), and FIG. 14(c) is a cross-sectional view of the film 2b taken along line Y—Y in FIG. 14(b);

FIG. 15; is an exploded perspective view showing a solid oxide electrolyte fuel cell (SOFC) comprising dimples to provide gas flow passages according to the earlier technology;

FIG. 18(a) is a sectional view taken along line X—X, and FIG. 18(b) is a sectional view taken along line Y—Y in FIG. 17, respectively;

FIG. 22(b) is a schematic front view of a SOFC comprising gas pre-flow rectifying sections according to the co-flow method, FIG. 22(a) is a cross-sectional view taken along line X—X in FIG. 22(b) and shows an air flow therein, and FIG. 22(c) is a cross-sectional view taken along line Y—Y in FIG. 22(b) and shows a fuel gas flow therein;

BEST MODE FOR CARRYING CUT THE INVENTION

In order to explain the present invention in more detail, preferred embodiments will be hereinafter described with reference to the accompanying drawings, which in no way limit the invention.

[Embodiment 1]

Figure 1:
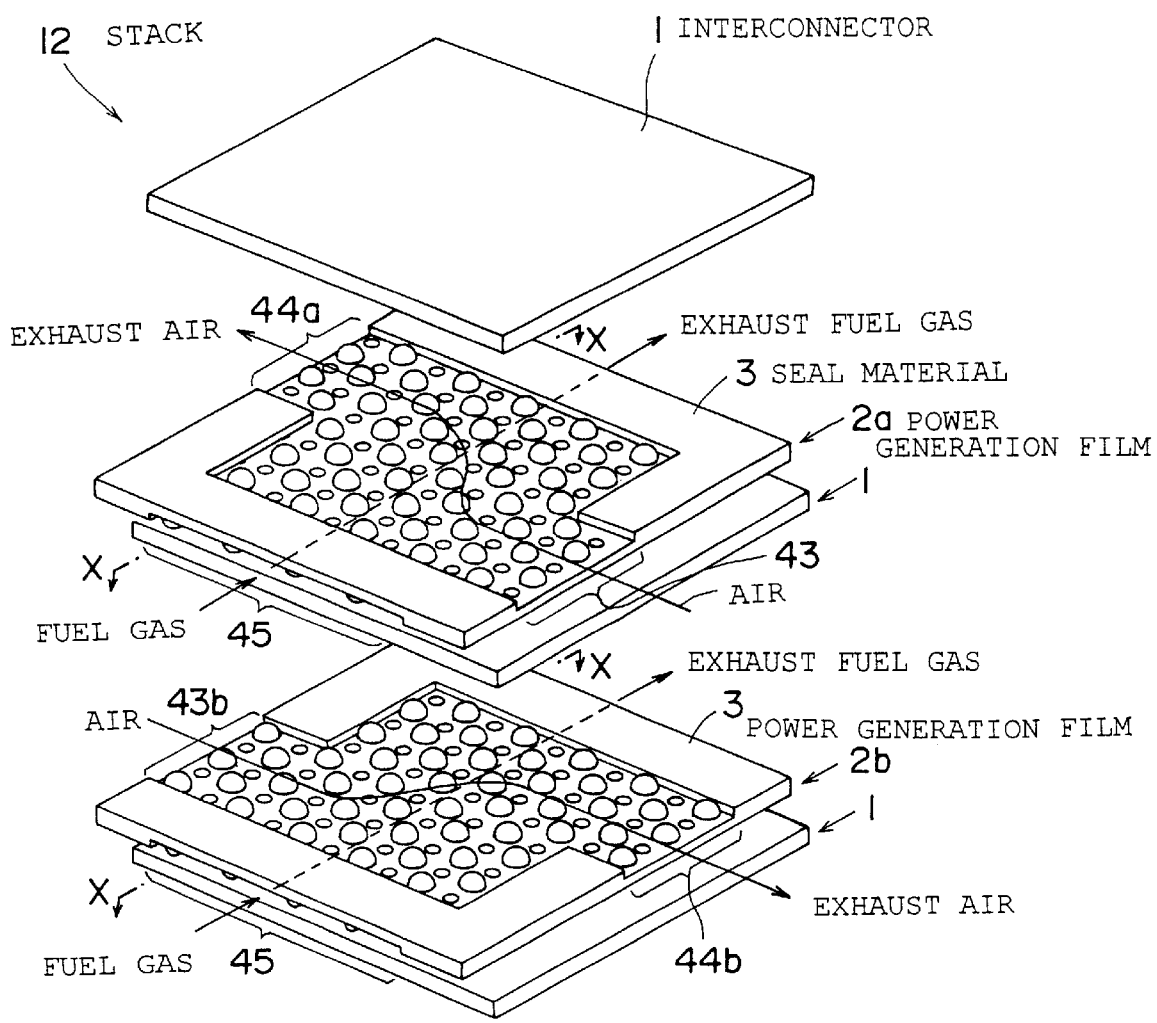
FIG. 1 is an exploded perspective view showing a planar type SOFC according to the first embodiment of the present invention.
Figure 2:
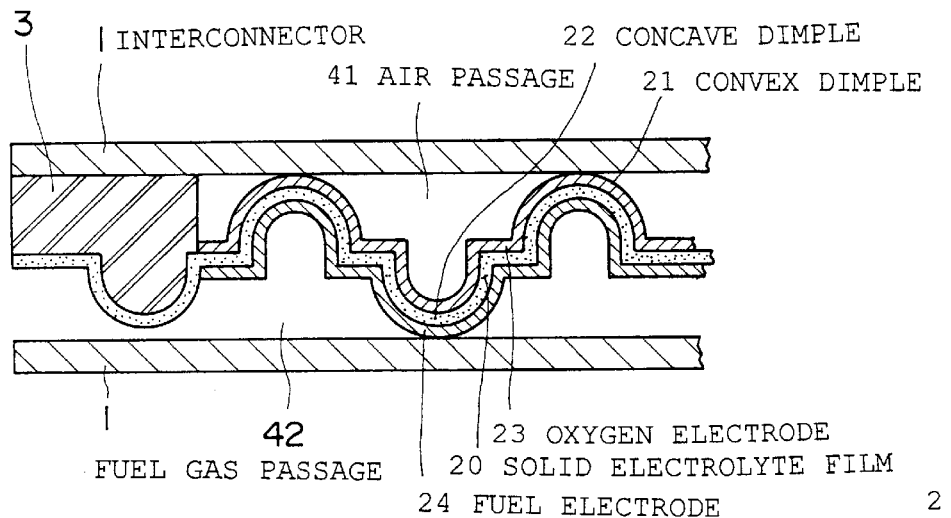
FIG. 2 is a sectional view along line X—X in FIG. 1.
Figure 5:
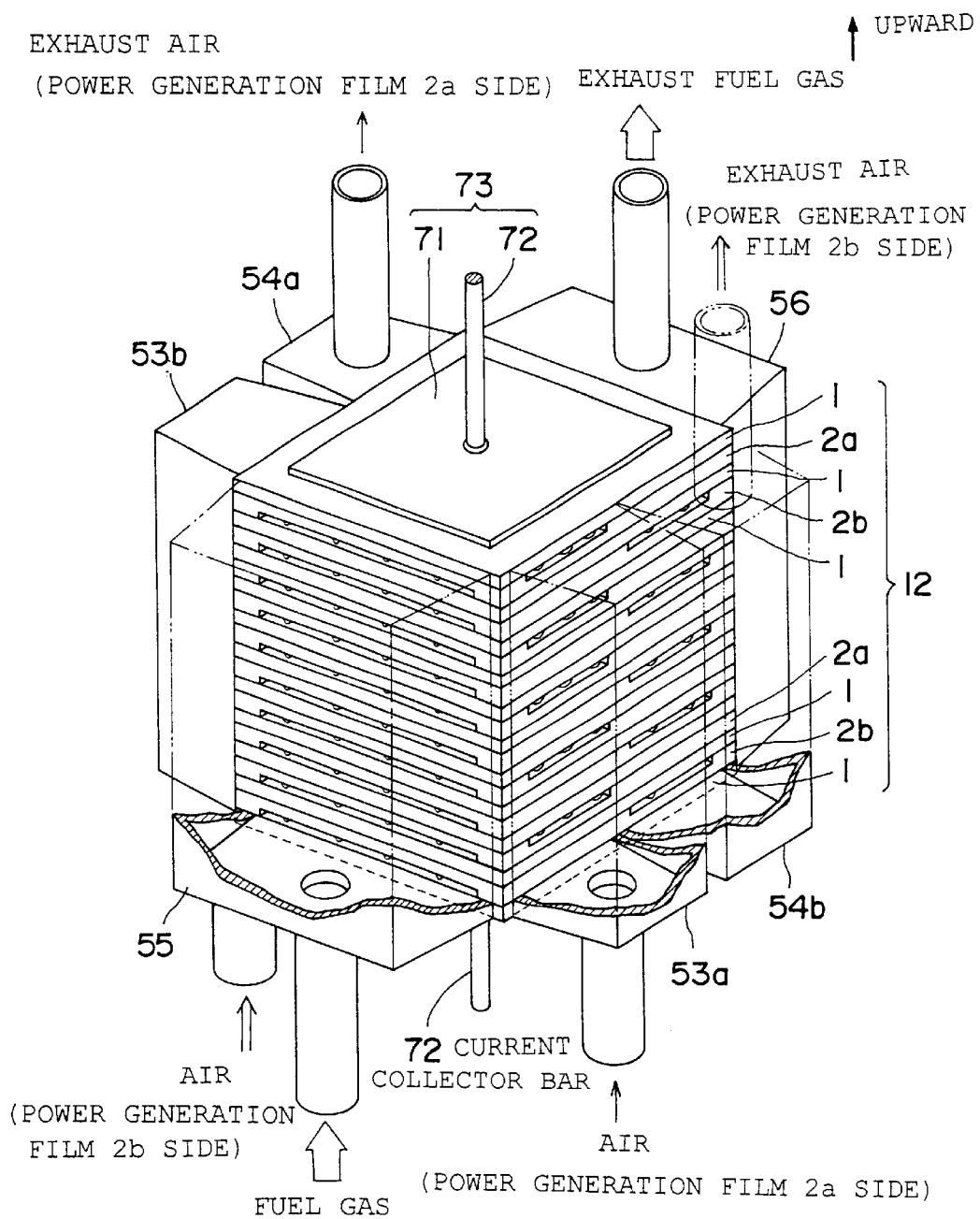
FIG. 5 is a perspective view showing a vertically placed SOFC in which manifolds for gas supply and discharge are attached to the unified fuel cell structure comprising a plurality of unit cells superposed upon one another.
Figure 6:
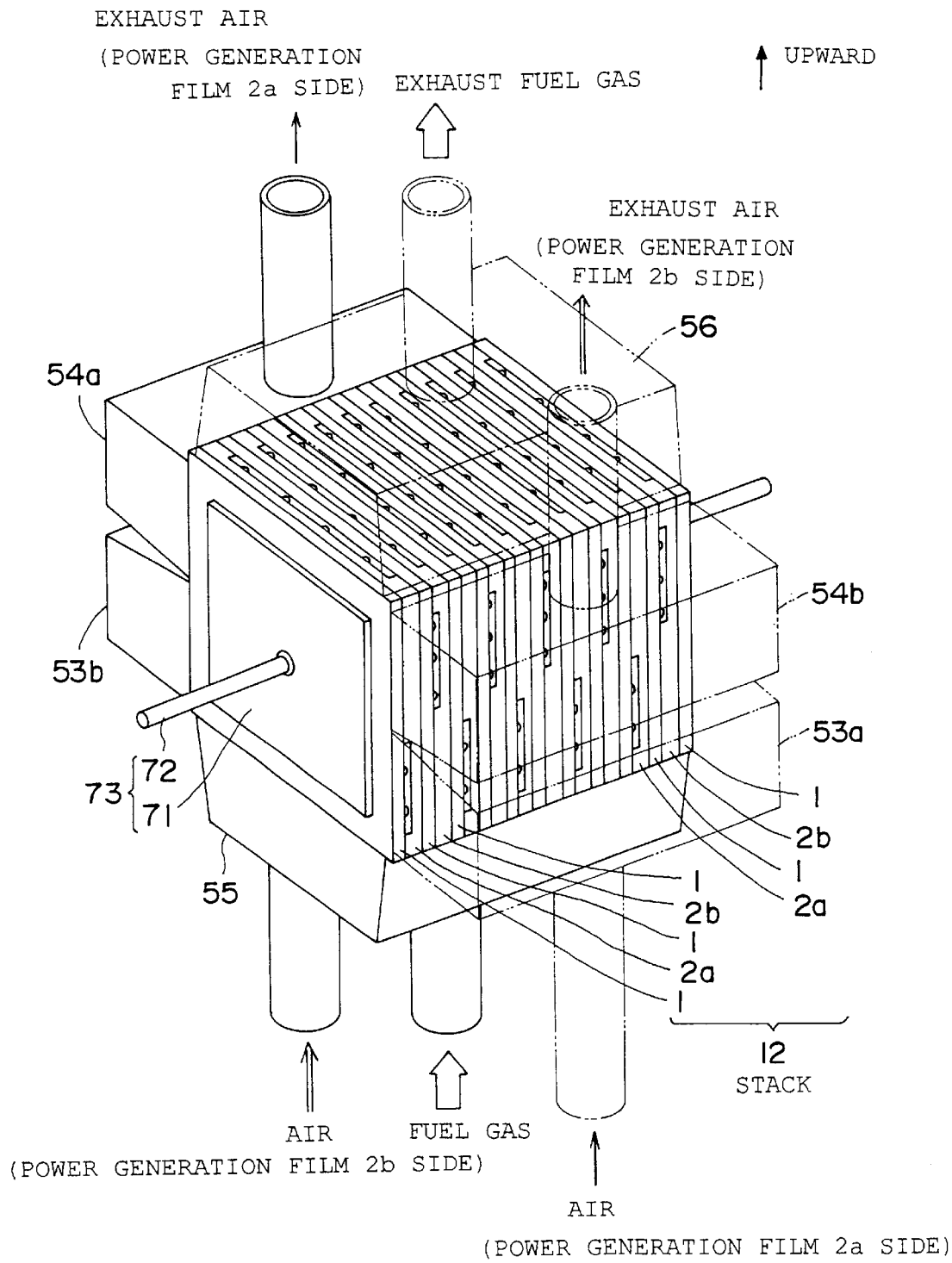
FIG. 6 is a perspective view showing a horizontally placed SOFC in which manifolds for gas supply and outlet are attached to the unified fuel cell structure comprising a plurality of unit cells superposed upon one another.

FIGS. 1 is an exploded perspective view of the planar type solid electrolyte fuel cell (hereinafter SOFC) in the first embodiment of the invention. FIG. 2 is a sectional view taken along line X—X in FIG. 1. FIGS. 3, 4 are schematic views, each consisting of a side view and a sectional view, showing two different kinds of unit cells (power generation films 2a, 2b). FIGS. 5 and 6 are perspective views of SOFC's in which manifolds for gas inlet and gas outlet are provided in a unified cell structure comprising multiple layers of unit cells according to the present invention.

Figure 16:
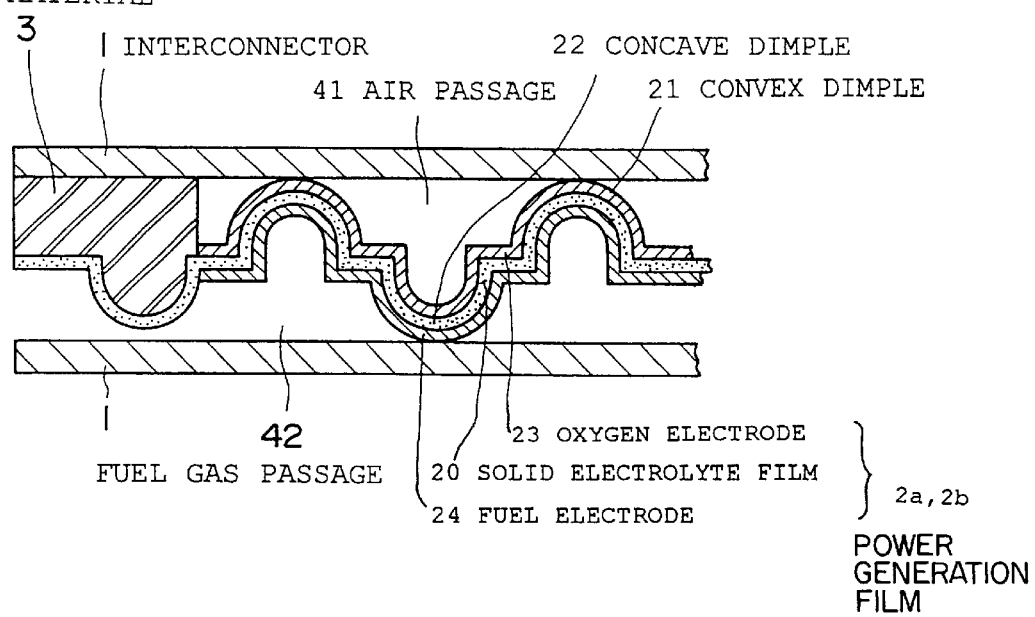
FIG. 16 is a sectional view taken along line X—X in FIG. 15.

In the first embodiment, the present invention is applied to a SOFC in which the power generation films comprise dimples as shown in FIGS. 15 and 16 explained in the earlier technology. The planar SOFC according to the first embodiment of the invention will be described with reference to FIG. 1 (exploded perspective view) and FIG. 2 (sectional view taken along line X—X in FIG. 1).

Reference numerals 2a and 2b in FIG. 1 denote power generation films, each of which is composed of a solid electrolyte film 20 comprising convex dimples 21 and concave dimples 22 almost all over the surface thereof, and the said electrolyte film having an oxygen electrode 23 on one side and a fuel electrode 24 on the other side thereof.

In FIGS. 1 and 2, the top side of the convex dimples 21 is the oxygen electrode 23, and the back side of the concave dimples 22 the fuel electrode 24, respectively.

The power generation films 2a and 2b are surrounded, except for the inlet and the outlet apertures through which gases pass through, by the seal material 3, thereby forming the air flow passages 41 and the fuel gas flow passages 42 which are each sandwiched between one power generation film and the adjacent interconnector 1 as illustrated in FIG. 2.

The power generation film 2a and the power generation film 2b have different air flow passages, which are shown in FIGS. 3 and 4 by using their respective side views and sectional views taken along lines X—X and Y—Y. In these figures, the middle part of the top side of the power generation films 2a and 2b is the oxygen electrode 23, and the back side is the fuel electrode 24, with the solid electrolyte film 20 sandwiched between both electrodes.

The part constituted by the electrodes 23 and 24 is the area in which cell reactions take place, and is generally called the effective power generation part, the surface area thereof being the effective power generation area.

Numeral 45 in FIG. 3 denotes a fuel gas inlet aperture which is open over nearly the entire length of one of the four sides on the fuel electrode side of the power generation films 2a and 2b, and numeral 46 referring to a fuel gas outlet aperture which is open over nearly the entire length of the opposite side of the fuel inlet aperture 45, with the remaining sides being surrounded by the seal material 3.

Reference numerals 43a, 43b in FIGS. 3 and 4 denote air inlet apertures; 44a and 44b, air outlet apertures, respectively. The air inlet apertures 43a, 43b and the air outlet apertures 44a, 44b are provided on one of the other two sides of the rectangular power generation film, on which neither the fuel gas inlet aperture 45 nor the fuel gas outlet aperture 46 is provided. The air inlet apertures 43a, 43b are provided in approximately that half of the said side which is closer to the gas inlet aperture 45, and the air outlet apertures 44a, 44b in approximately that half of the side which is closer to the fuel gas outlet aperture 46.

The part of the four sides other than the apertures is surrounded by the seal material 3, which means that, in the power generation film 2 as shown in the sectional view taken along line X—X in FIG. 3, the air is surrounded by the seal material 3 so as to enter from the air inlet aperture 43a situated in the lower right side in FIG. 3(a), and is guided to the air outlet aperture 44a situated on the upper left side therein.

Similarly, in the power generation film 2b shown in the sectional view taken along line X—X in FIG. 4, the air is surrounded by the seal material 3 so as to enter from the air inlet aperture 43b situated on the lower left side in FIG. 4(a), and is guided to the air outlet aperture 44b situated on the upper right side therein.

On the other hand, on the side of the fuel electrode 24 in the power generation films 2a and 2b shown in the sectional views taken along line Y—Y in FIGS. 3 and 4, as indicated in FIGS. 3(d) and 4(d), the fuel gas is surrounded by the seal material 3 so as to enter from the fuel gas inlet aperture 45 located on the upper side in these figures, and is guided to the fuel gas outlet aperture 46 located on the lower side therein.

In other words, the power generation films 2a and 2b have two different configurations in which the structure concerning the fuel gas flow passages 42 is the same, whereas the air flow passages 41 are symmetric with respect to the axis of fuel gas flow.

The power generation films 2a, 2b having two such different structures are so arranged to constitute a unified cell structure 12 (hereinafter stack 12), wherein from top to bottom an interconnector 1, a power generation film 2a, an interconnector 1, a power generation film 2b, etc., are alternately superposed upon one another, thus forming multiple layers with interconnectors and power generation films being sandwiched alternately, and the power generation films being stacked in an alternating sequence of 2a, 2b, 2a, 2b . . . .

FIG. 5 is a perspective view exemplifying a SOFC according to the present invention, wherein the stack 12 thus constituted is placed vertically and is provided with manifolds for gas supply and discharge.

In the said figure, reference numerals 53a, 53b denote air inlet manifolds; 54a, 54b, air outlet manifolds; 55, a fuel gas inlet manifold; 56, a fuel gas outlet manifold.

The air inlet manifold 53a is attached so that about a half of the total inlet air volume is provided to the oxygen electrode side of each power generation film 2a, whereas the air outlet manifold 54a is fitted so that all the air that has passed the power generation films 2a can be discharged.

In a similar manner, the air inlet manifold 53b and the air outlet manifold 54b are attached so that about the remaining half of the total inlet air volume is provided to, and discharged from the oxygen electrode side of each power generation film 2b.

On the other hand, the fuel gas inlet manifold 55 is fitted so that the whole inlet fuel gas can be supplied to the fuel electrode side of all the power generation films 2a and 2b, whereas the fuel gas outlet manifold 56 is attached so that the whole fuel gas after the cell reaction can be discharged.

Reference numeral 71 in FIG. 5 denotes a current collector plate; 72 and 73, current collector bars and current collector parts, respectively.

FIG. 6 is a perspective view illustrating a SOFC in which the stack 12 shown in FIG. 1 is placed horizontally, wherein the numerals refer to the same components as in FIG. 5.

In the horizontally placed SOFC shown in FIG. 6, the fuel gas inlet manifold 55 is fitted on the lower side of the horizontally placed stack 12, and the fuel gas outlet manifold 56 on the upper side thereof, whereas the air inlet manifolds 53a, 53b are fitted in about that lower half of the side of the horizontally placed stack 12 which is closer to the fuel gas inlet manifold 55, and the air outlet manifolds 54a, 54b are fitted in about that upper half of the side of the stack 12 which is closer to the fuel gas outlet manifold 56.

In order to generate power in a SOFC of the present invention, the temperature is kept at 800° C.~1000° C. as in conventional SOFC'S, and an oxidant gas (e.g. air, hereinafter air) and a fuel gas are provided to flow in their respective flow passages. In the SOFC in which the power generation films 2a are so constituted as in FIGS. 1, 2, 3, 5, and 6, air is supplied from the air inlet manifold 53a, passing through the air inlet aperture 43a, and after a heat generating reaction in the effective power generation area which constitutes both electrodes of each power generation film 2a, the remaining air (hereinafter exhaust air) is guided through the air outlet aperture 44a and discharged to the air outlet manifold 54a.

Then, in the SOFC in which the power generation films 2b are so constituted as in FIGS. 1, 2, 4, 5, and 6 of the present invention, air is supplied from the air inlet manifold 53b, passing through the air inlet aperture 43b, and after a heat generating reaction in the effective power generation area which constitutes both electrodes of each power generation film 2b, the exhaust air is guided through the air outlet aperture 44b and discharged to the air outlet manifold 54b.

The fuel gas, on the other hand, is supplied from the fuel gas inlet manifold 55, passing through the fuel gas inlet aperture 45, and after a heat generating reaction in the effective reaction area of the power generation films 2a and 2b, the exhaust fuel gas is guided through the fuel gas outlet aperture 46 and discharged to the fuel gas outlet manifold 56.

The above-mentioned reaction generates heat so that the temperature near the gas supply area is lower than that in the gas outlet area. The temperature distribution varies depending on the electrode characteristics, the inlet temperature of each gas, and the gas volume. FIG. 19(a) shows, as an example, an isothermal diagram of the unit cell of the power generation film 2a. The % values in the figure indicate ratios when the temperature difference between the gas inlet and the gas outlet is assumed to be 100%. Even if the temperature difference varies when the gas conditions, etc., change, the isothermal diagram remains almost the same.

In the power generation film 2b, the fuel gas flow is in the same direction as in the power generation film 2a, and the air flow is symmetric with respect to the axis of fuel gas flow in the power generation film 2a. As a result, an isothermal diagram as shown in FIG. 19(b) is obtained.

Figure 19:
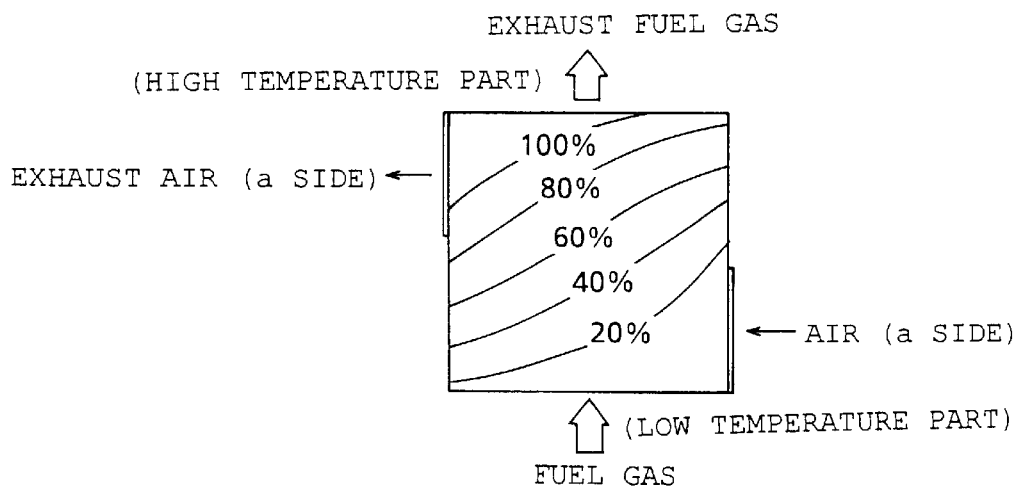
FIGS. 19(a), 19(b), and 19(c) show isothermal diagrams of the unit cell of a power generation film.
Figure 19:
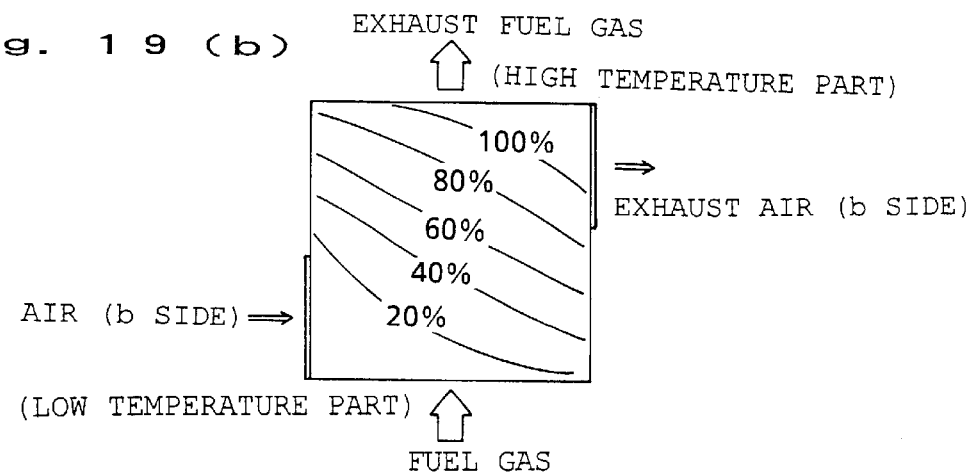
Figure 19:
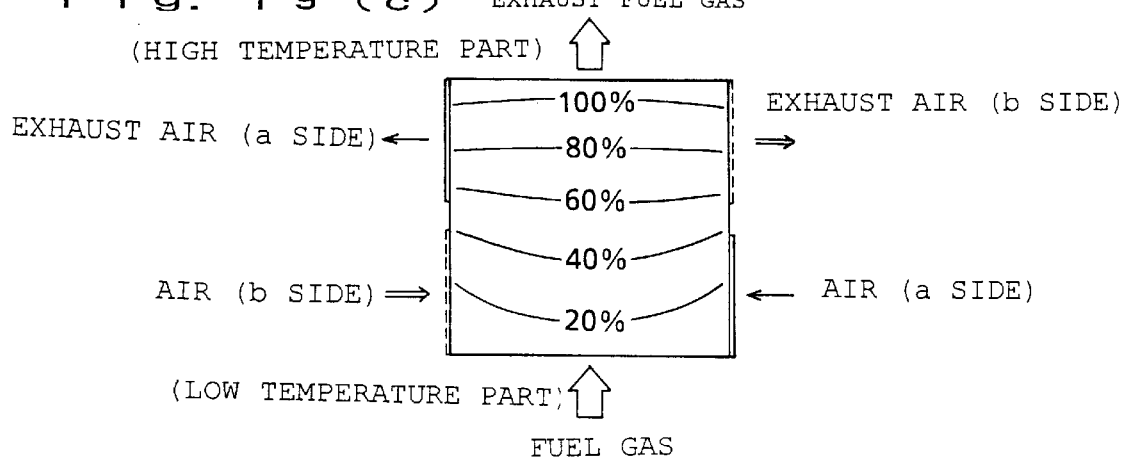
Figure 20:
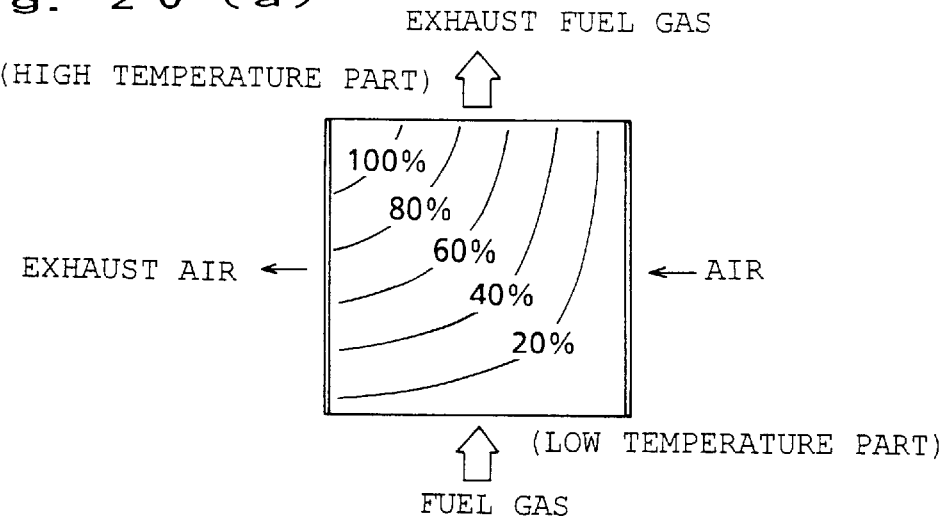
FIGS. 20(a) and 20(b) show isothermal diagrams of the unit cell of a power generation film.
Figure 20:
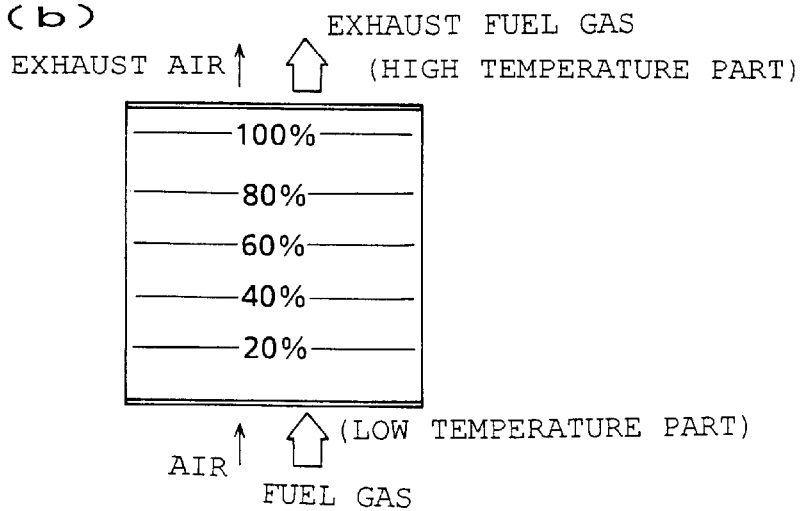

These isothermal diagrams in FIGS. 19(a), 19(b) are more similar to that by the parallel method as shown in FIG. 20(b) as compared with the isothermal diagram of the cross flow type given in FIG. 20(a), thus lowering thermal stress and preventing deterioration of the fuel cell performance which may be caused by shear or separation of the electrical connection or sealing between the power generation films and the interconnectors. Besides, reliable characteristics of the cell can also be ensured, because cracks between the power generation films and the interconnectors as well as other similar problems due to excessive local thermal stress can be avoided.

In summary, in a SOFC which comprises either the power generation film 2a or the power generation film 2b of the present invention, the aforementioned problems associated with the cross flow method and the co-flow method can be solved at the same time, and the advantages of both methods can be realized.

Furthermore, in the power generation films 2a and 2b of the present invention, the isothermal diagrams in FIGS. 19(a) and 19(b) are symmetric with respect to the direction of fuel gas flow, as far as the gas is supplied to the power generation films under the same condition. As a result, in the SOFC comprising the stack 12 in which the power generation films 2a and 2b are superposed alternately with interconnectors sandwiched in-between as in FIGS. 1, 5 and 6, heat exchange in the height direction (i.e. perpendicular to the layers of the stack) is promoted, resulting in a uniform temperature distribution throughout the stack 12.

In other words, in the FOSC in which the layers are so superposed as in FIGS. 1, 5 and 6, an isothermal diagram as shown in FIG. 19(c) is obtained, which is more similar to that in FIG. 20(b) than to those given in FIGS. 19(a) and 19(b). Therefore, the heat stress in this case is almost equal to that of the parallel flow method, and is smaller than in the SOFC in which only one of the power generation films 2a or 2b is used. As a result, reliable characteristics of the cell can be ensured.

In the present invention, it is desirable to incorporate each interconnector 1 in a thin and flat shape as shown in FIG. 1, because more heat exchange in the direction perpendicular to the layers lowers thermal stress and enhances the characteristics of the fuel cell. One of the means to promote such heat exchange is, for example, to provide grooves in the interconnectors, which increase the surface area that comes in direct contact with the gases, and significantly decrease the thermal stress in the present invention.

Figure 21:
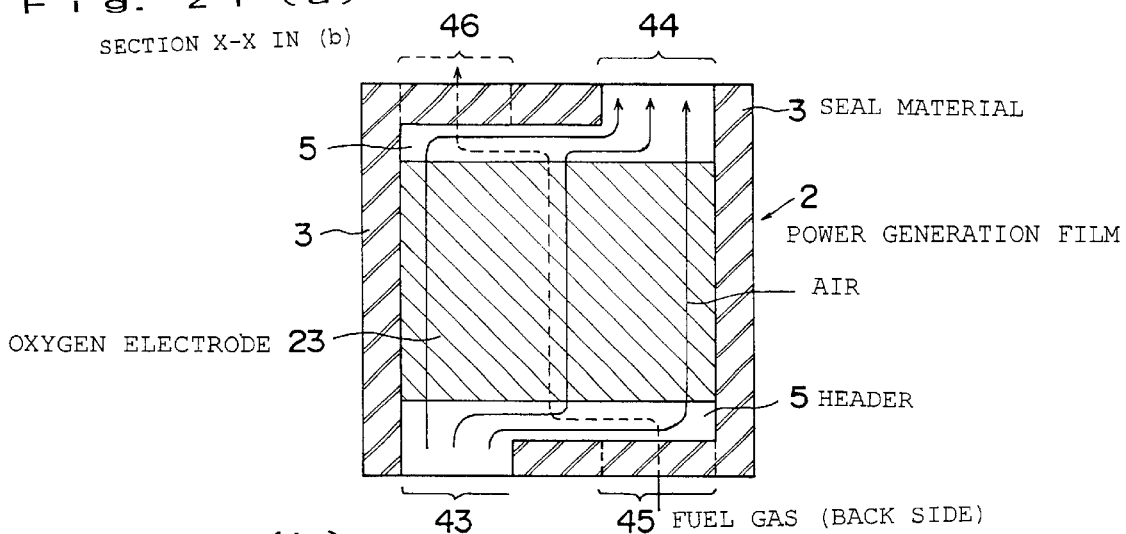
FIG. 21(b) is a schematic front view of a SOFC comprising a header according to the co-flow method.
FIG. 21(a) is a cross-sectional view taken along line X—X in FIG. 21(b) and shows an air flow therein.
FIG. 21(c) is a cross-sectional view taken along line Y—Y in FIG. 21(c) and shows a fuel gas flow therein.
Figure 21:
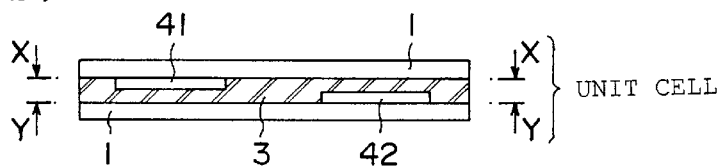
Figure 21:
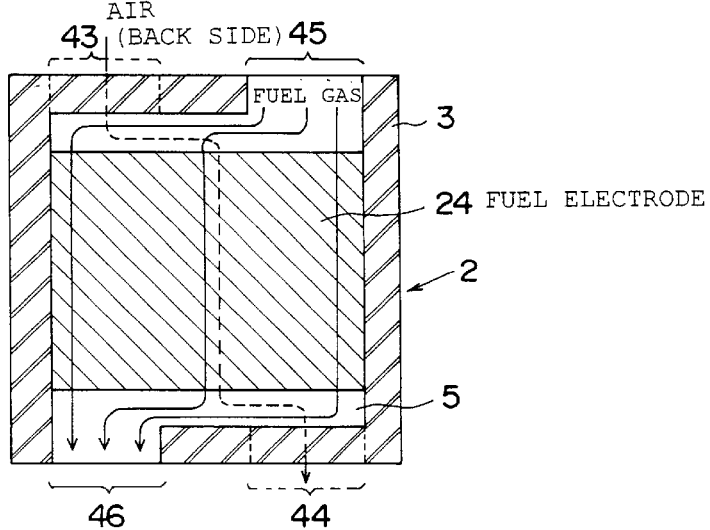

In contrast to the SOFC according to the conventional co-flow method shown in FIG. 21, a SOFC according to the present invention does not require a header 5, which does not contribute to power generation, in order to rectify the gas flow, and can provide oxygen electrodes and fuel gas electrodes over a wide range of solid eletrolytes, thus increasing the effective area that can be used for power generation.

This means that the area for the header 5 can be used as part of the effective power generation area, and as a result, the effective power generation area of the embodiment of the invention shown in FIG. 2 is 10%~25% larger than that of a SOFC by the conventional co-flow method which needs a header shown in FIG. 21. In other words, in order to obtain the same power output in the present invention as in the conventional SOFC, only 80%~90% of the amount of unit cells of the conventional fuel cells are required.

As shown in the perspective views in FIGS. 5 and 6, even if manifolds and current collector parts are fitted to the SOFC of the invention, sufficient compactness can be ensured, thus providing a highly economical SOFC.

In the horizontally placed SOFC of the present invention as shown in FIG. 6, the gas inlet aperture (43a, 43b, 45 in FIG. 1) which is in a lower temperature range is arranged on the lower side of the horizontally placed stack 12, and the gas outlet aperture (44a, 44b, 46 in FIG. 1) which is in a higher temperature range due to the heat generating cell reaction is on the upper side of the horizontally placed stack 12. In such an arrangement, about a half of the total inlet air volume is supplied from the air inlet manifold 53a to the oxygen electrode side of the power generation film 2a, and after being gradually heated up by the cell reaction of the power generation film 2a, discharged to the air outlet manifold 54a. Similarly, about the remaining half of the total inlet air volume is supplied from the air inlet manifold 53b to the oxygen electrode side of the power generation film 2b, and after being gradually heated up by the cell reaction, discharged to the air outlet manifold 54b. The fuel gas, on the other hand, is supplied from the fuel gas inlet manifold 55 to the fuel gas electrode side of the power generation films 2a, 2b, and after being gradually heated up by the cell reaction, discharged to the fuel gas outlet manifold 56.

In the horizontally placed SOFC shown in FIG. 6 of the invention, the gas flow passage is so constituted that the air and the fuel gas are guided from the lower to the upper part, then being heated by the cell reaction, resulting in buoyancy due to a reduced specific weight, which makes the gas flow from the lower to the upper part smoother than in a vertically placed SOFC such as in FIG. 1.

Therefore, in the horizontally placed SOFC in FIG. 6, the temperature difference between the gas inlet aperture and the gas outlet aperture in the cell becomes smaller than that in the vertically placed SOFC shown in FIG. 5, thus limiting the heat stress to provide a SOFC which is not only highly reliable, but also economical as the energy required for gas supply can be kept at a low level.

As described above, in a SOFC according to the present invention, the temperature distribution in the stack due to the heat generation by the cell reaction can be similar to that of a FOSC according to the co-flow method, and the heat stress can be made smaller than that of a SOFC by the cross flow method, thus making it possible to reduce damages in the electrical connection between the power generation films and the interconnectors or in the sealing part, as well as cracks and other problems in the power generation films or in the interconnectors. As a result, a highly reliable SOFC can be provided.

In addition, a SOFC of -he present invention does not require a gas flow rectifying section (where no power is generated) which is one of the disadvantages of the co-flow method, and can ensure an effective power generation area which is comparable with that by the cross flow method, thus providing a compact and economical SOFC.

In summary, the present invention provides a SOFC that compensates the disadvantages of the cross flow method and of the co-flow method, and realizes the advantages of both methods at the same time.

In the above explanation referring to FIGS. 1, 2, 3, 4, and 5, the upper side of the power generation films is the oxygen electrode and the lower side thereof is the fuel electrode. However, the upper side and the lower side may be reversed.

It is also possible to replace the oxygen electrode side and the fuel electrode side completely with each other to realize a SOFC which comprises two kinds of fuel gas passages and one kind of air flow passage, with an effect provided by the present invention.

In the embodiments described above, a configuration in which power generation films are superposed via interconnectors comprising grooves as in FIG. 1, and another configuration in which power generation films comprise dimples all over the surface thereof as in FIG. 2 are exemplified. However, it goes without saying that the present invention is not limited to such embodiments, and can be applied to any form of fuel cell.

[Embodiment 2]

Figure 7:
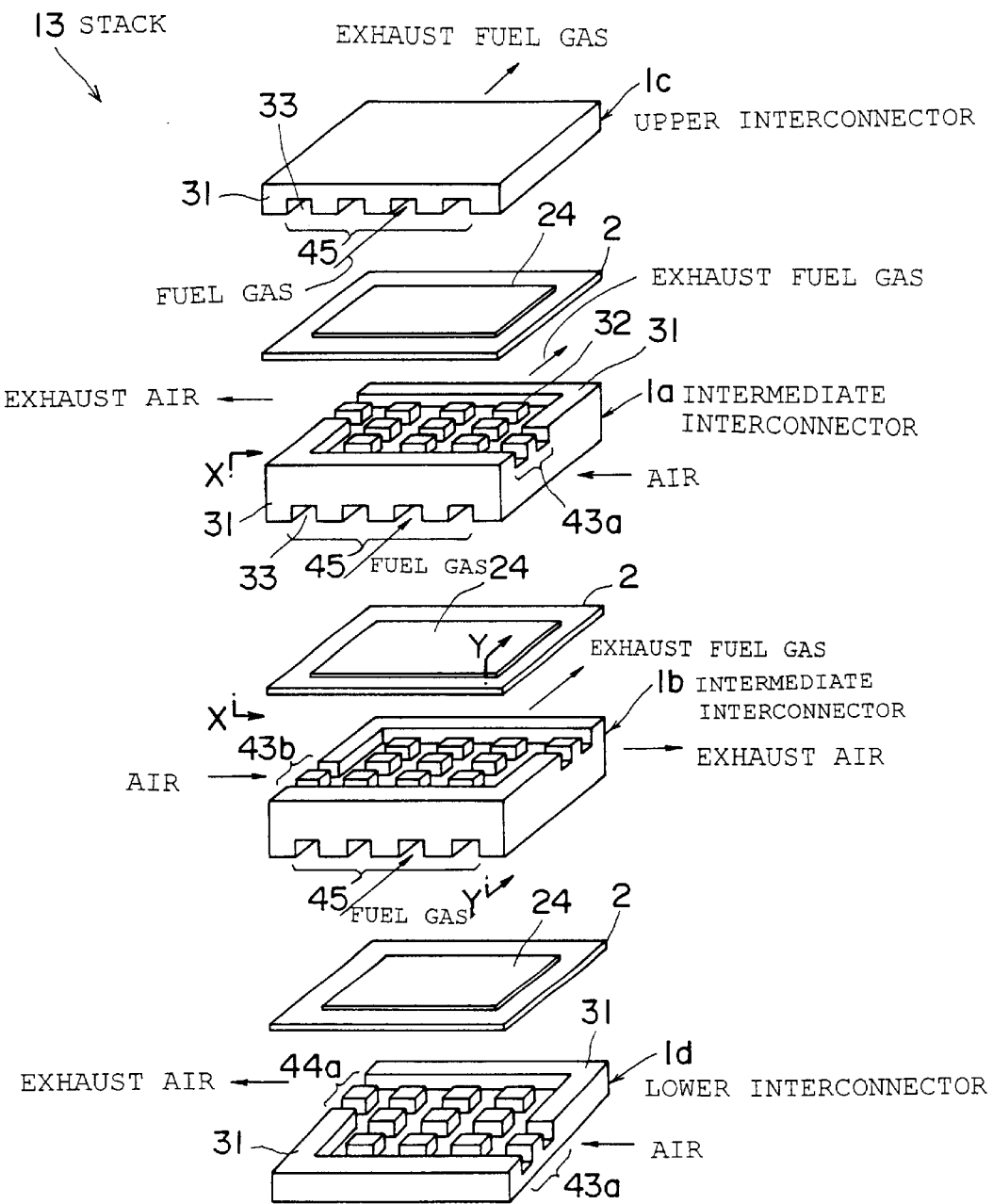
FIG. 7 is an exploded perspective view showing a planar type SOFC according to the second embodiment of the present invention.

FIG. 7 is an exploded perspective view showing a planar type solid oxide electrolyte fuel cell (hereinafter SOFC) according to the second embodiment of the invention; FIG. 8(a), a sectional view taken along line X—X in F-G. 7; FIG. 8(b), a sectional view taken along line Y—Y in FIG. 7. FIGS. 9 and 10 are schematic views of intermediate interconnectors according to the second embodiment, illustrating two different groove patterns as air flow passages.

Figure 17:
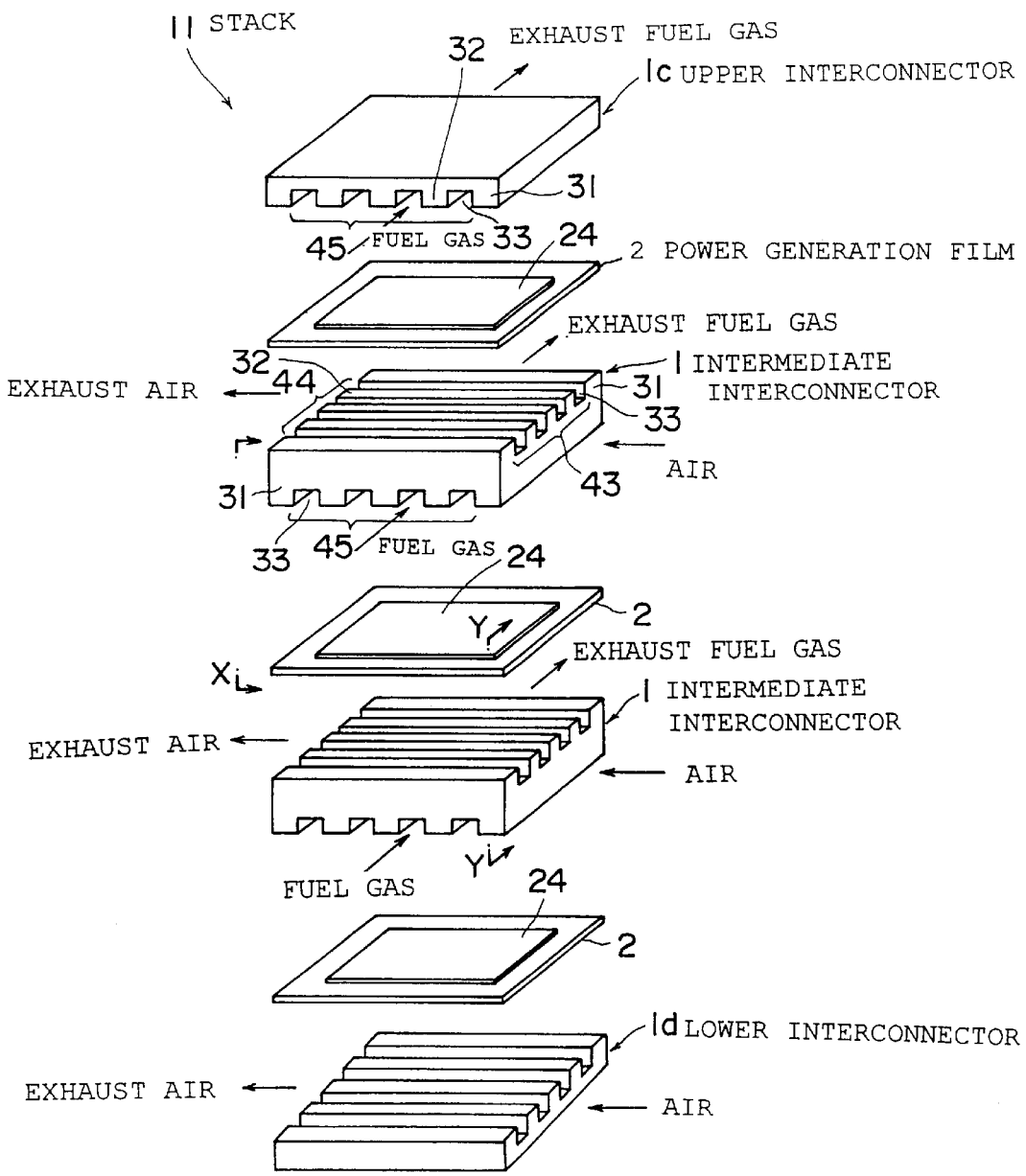
FIG. 17 is an exploded perspective view showing a SOFC in which grooves are provided in interconnectors to form gas flow passages.

The second embodiment is an example in which the present invention is applied to a typical planar SOFC by the cross flow method as shown in FIGS. 17, 18(a), and 18(b).

The planar SOFC according to the second embodiment of the invention will be described with reference to the exploded perspective view in FIG. 7, the sectional view shown in FIG. 8(a) taken along line X—X, and FIG. 8(b) along line Y—Y in FIG. 7, respectively, as well as the schematic views in FIGS. 9 and 10.

Reference numeral 2 in FIGS. 7, 8(a), and 8(b) denotes a power generation film. Each power generation film 2 is composed of a planar solid electrolyte film 20 which comprises an oxygen electrode 23 on one side and a fuel electrode 24 on the other side thereof. In the drawing, the upper side of the power generation film 2 is the fuel electrode 24 and the lower side the oxygen electrode 23. Reference numerals 1a, 1b, 1c, and 1d in the drawing refer to the interconnectors which are superposed alternately with power generation films 2 to form a unified cell structure 13 (hereinafter stack 13).

FIGS. 9 and 10 are schematic views of interconnectors 1a, 1b, respectively. The interconnectors 1a and 1b are those which are placed in the intermediate layers of the stack 13 as shown in FIG. 7, both sides of which are surrounded by the support frame 31 of the power generation films, except the gas inlet aperture and the gas outlet aperture where the gases pass. The support frame 31 and the circumference of the power generation films 2 contact tightly with the sandwiched seal material 3, thus securing tightness for the gases that flow through the inside of the cell.

On both sides of the interconnectors 1a and 1b, multiple island-shaped protrusions 32 are arranged in an orderly manner to constitute multiple rows of gas flow grooves 33. The top of the island-shaped protrusions 32 contacts or connects with the fuel electrode 24 or the oxygen electrode 23, thus supporting the power generation films 2 as well as connecting the adjacent power generation films electrically in series. As shown in FIGS. 9 and 10, the interconnectors 1a and 1b are different concerning the shape of the air flow passage 41 which contacts the fuel electrode side of the adjacent power generation film, and are the same concerning the shape of the gas flow passage 42 which contacts the fuel electrode side of the adjacent power generation film.

Reference numerals 43a and 43b in FIGS. 9 and 10 denote air inlet apertures; 44a and 44b, air outlet apertures; 45, a fuel gas inlet aperture; 46, a fuel gas outlet aperture. The fuel gas inlet aperture 45 is open along the whole length of one side of the rectangular interconnector, and the gas outlet aperture 46 is open along the whole length of the side opposite to the side which is provided with the fuel inlet aperture 45.

The air inlet apertures 43a, 43b and the air outlet apertures 44a, 44b are placed on the back side (the side which contacts the air electrode 23 of the power generation film) of the remaining two sides of the rectangular interconnector, the said two sides having neither the fuel gas inlet aperture 45 nor the fuel gas outlet aperture 46. The air inlet apertures 43a, 43b are provided in about that half of the said side which is closer to the fuel gas inlet aperture 45, and the air outlet apertures 44a, 44b in about that half of the said side which is closer to the gas outlet aperture 46.

In the interconnector 1a shown in FIG. 9, the air flow passage 41 is constituted on the surface of the interconnector so that the air enters through the air inlet aperture 43a which is located in the lower right part and is guided to the air outlet aperture 44a in the upper left part in FIG. 9(a).

In the interconnector 1b shown in FIG. 10, the air flow passage 41 is constituted so that the air enters through the air inlet aperture 43b which is located in the lower left part and is guided to the air outlet aperture 44b in the upper right part in FIG. 10(a).

The fuel gas flow passages 42, on the other hand, have the same shape in both interconnectors 1a and 1b. As shown in FIGS. 9(d) and 10(d), a support frame 31 for the adjacent power generation film is provided in the circumference, and the fuel gas flow passages 42 are constituted in the middle part of the interconnector surface, so that the fuel gas enters through the fuel gas inlet aperture 45, and is guided to the fuel gas outlet aperture.

As explained above, the interconnectors 1a, 1b are two different structures in which the fuel gas flow passages 42 have the same shape, and the air flow passages 41 are symmetric with respect to the direction of the fuel gas flow.

The interconnector 1c in FIG. 7 is an upper interconector placed on top of the stack 13, the upper surface of which is usually flat to fit current collector parts, and the lower surface of which has the same shape as the lower surface of the interconnector 1a or 1b (FIG. 9(d) or FIG. 10(d)) described earlier, corresponding to the fuel electrode side of the adjacent power generation film 2. The interconnector Id is a lower interconnector placed in the lower end of the stack 13, the upper surface of which has the same shape as the upper surface of the interconnector 1a or 1b (FIG. 9(a) or FIG. 10(a)), corresponding to the oxygen electrode side of the adjacent power generation film 2, whereas the lower surface thereof is usually flat to fit current collector parts.

The interconnectors 1a, 1b, 1c, 1d and the power generation films 2 having the above features are then superposed alternately as shown in FIG. 7, wherein, from top to bottom, an interconnector 1a, a power generation film 2, an interconnector 1b, . . . , a power generation film 2, an interconnector 1d are alternately superposed, whereas the interconnectors except the uppermost and lowermost interconnectors 1c, 1d constitute a unified structure (stack 13) in such a manner that the interconnectors 1a, 1b, 1a, 1b, . . . are superposed alternately.

Compared with the stack 12 in the first embodiment, the stack 13 thus constituted is the same as the first embodiment of the present invention concerning the basic structure and functions, except that the inlet and outlet apertures as well as the flow passages are constituted differently. Therefore, the SOFC of the second embodiment which is equipped with manifolds to supply and discharge gases can be regarded as the SOFC having the same appearance and functions as in the SOFC shown in FIG. 5. Also, similar to the first embodiment explained with reference to FIG. 6, the stack 13 can be placed horizontally with the fuel outlet aperture 46 toward upwards and the fuel inlet aperture 45 toward downwards.

When compared with the stack 12 in the first embodiment of the invention, the stack 13 constituted as in FIG. 7 has the same basic structure and functions in terms of gas supply and discharge, except that the gas flow passages which are sandwiched between the interconnectors and the power generation films are constituted differently, thus reducing the heat stress in a manner similar to the first embodiment, and providing a highly reliable SOFC as a result.

Also in the second embodiment, similar to the first embodiment, it is possible to increase the surface area of the interconnectors that come in contact with gases to promote heat exchange and reach an effect intended by the present invention. For this reason, it is preferable to increase the number of grooves for gas flow on the surface of the interconnectors to obtain the largest possible contact surface with gases. In the stack 13 in the second embodiment of the invention, similar to the stack 12 of the first embodiment, it is possible to adopt the configuration shown in FIGS. 5 and 6 in order to have comparable functions and effects, thus providing a highly reliable and economical SOFC.

In FIGS. 7, 8(a), 8(b), 9(a), (b), (c), (d), 10(a), (b), (c), (d) explained above, the upper side of the power generation films is the fuel electrode, and the lower side thereof the oxygen electrode. However, the oxygen electrode side and the fuel electrode side may be reversed. A comparable effect can also be obtained by replacing the oxygen electrode side and the fuel electrode side completely to constitute a SOFC having two kinds of fuel gas flow passages and one kind of air flow passage, thus realizing another SOFC according to the second embodiment of the invention.

In the second embodiment of the invention, an example in which the interconnectors are provided with grooves to form gas passages is shown. However, as explained in the first embodiment, as far as gas passages can be constituted between the interconnectors and the power generation films to provide gases to both electrodes of the power generation films and electrical connections (contact or connection between the interconnectors and the power generation films) can be provided, any configuration can constitute a SOFC of the present invention to obtain similar effects.

[Embodiment 3]

Figure 11:
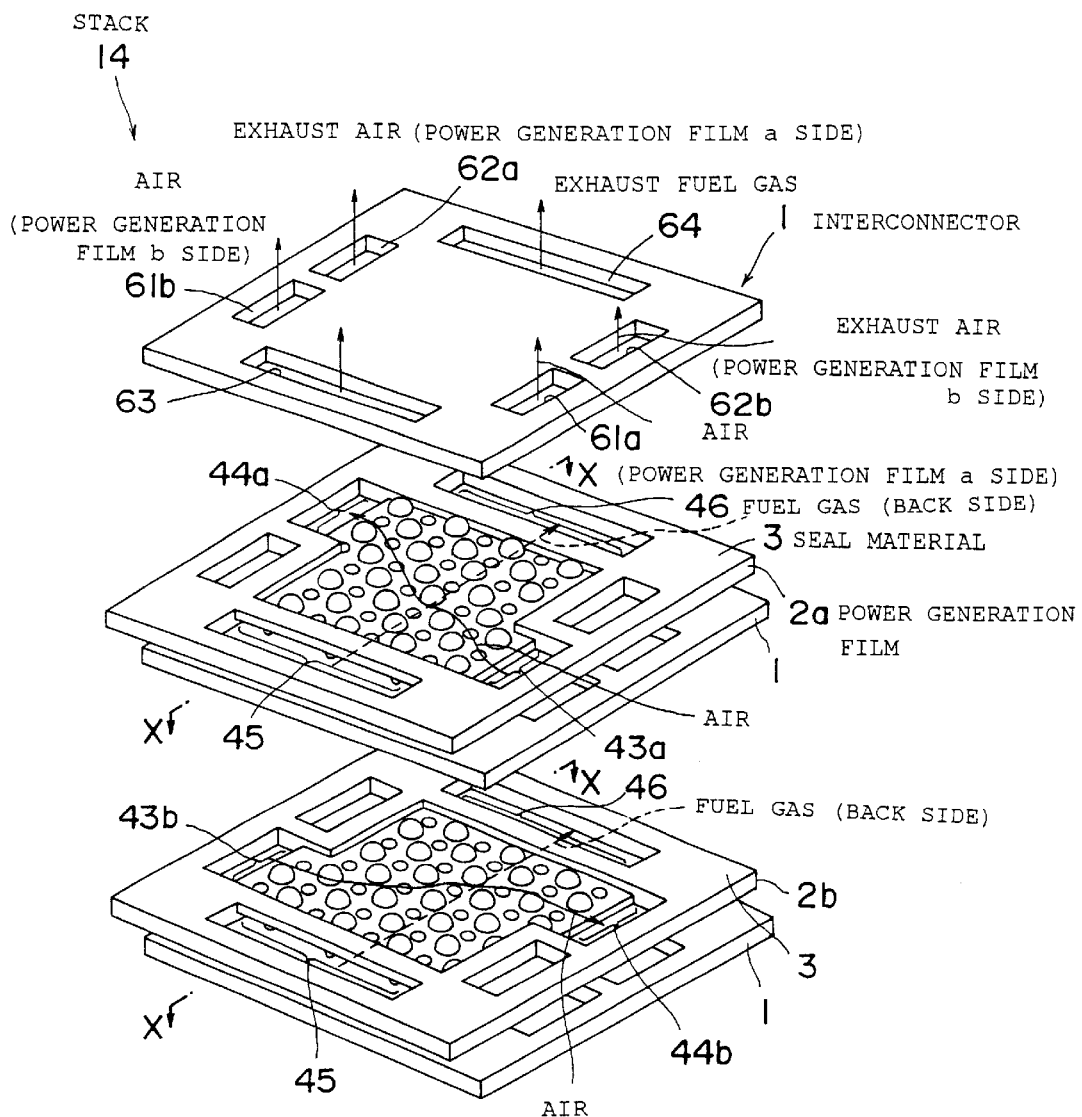
FIG. 11; is an exploded perspective view showing a planar type SOFC comprising internal manifolds according to the third.
Figure 12:
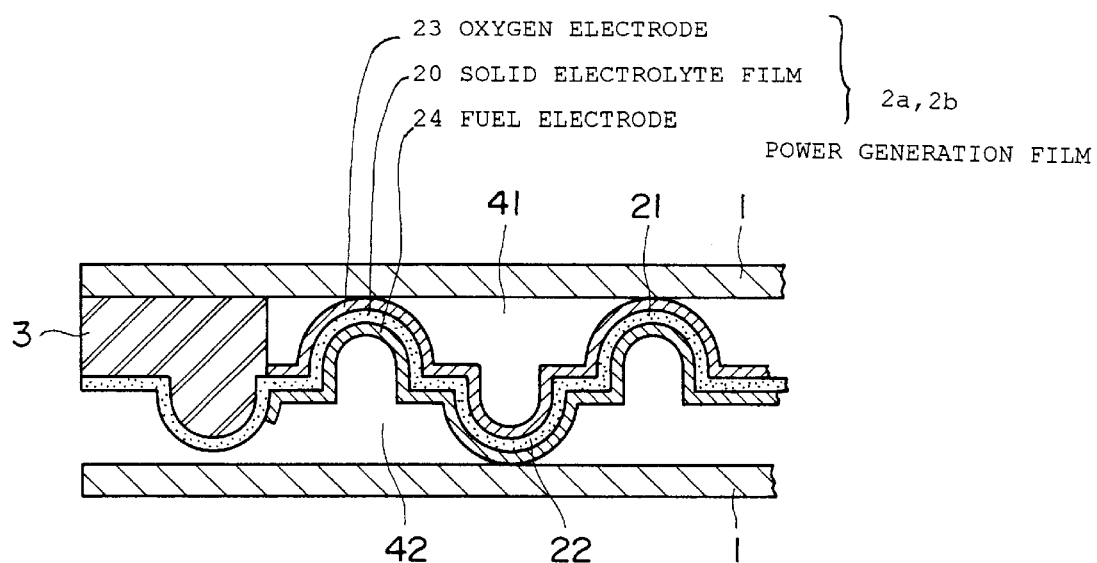
FIG. 12 is a sectional view taken along line X—X in FIG. 11.
Figure 13:
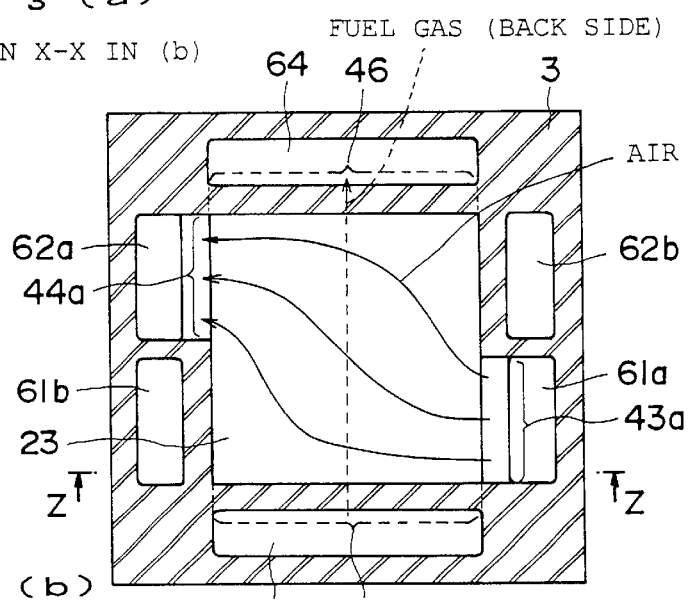
FIG. 13(b) is a schematic front view of the power generation film 2a in the third embodiment.
FIG. 13(a) is a cross-sectional view of the film 2a taken along line X—X in FIG. 13(b)
FIG. 13(c) is a cross-sectional view of the film 2a taken along line Y—Y in FIG. 13(c)
Figure 13:
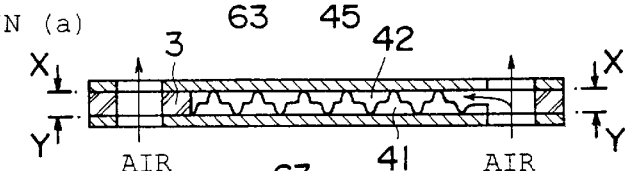
Figure 13:
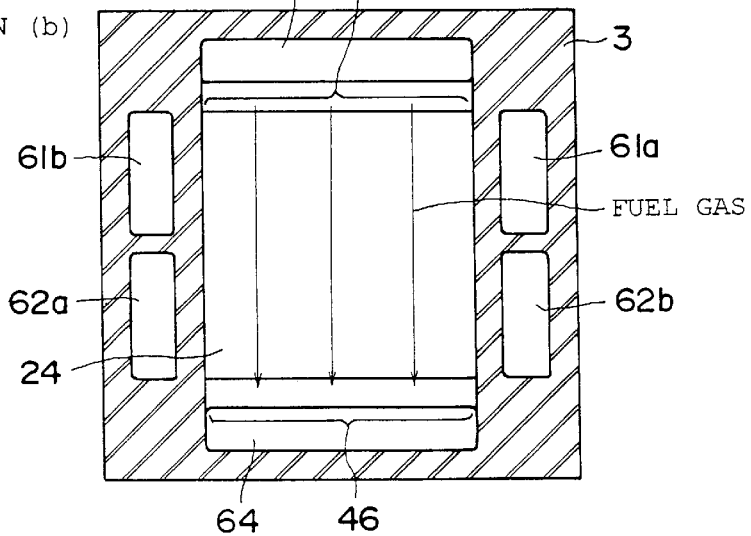

FIG. 11 is an exploded perspective view showing a planar type solid electrolyte fuel cell (hereinafter SOFC) according to the third embodiment of the invention; FIG. 12, a sectional view taken along line X—X in FIG. 11; FIGS. 13 and 14, each showing a side view and sectional views to illustrate two types of unit cells with internal manifolds, in which different kinds of air flow passages are realized.

In FIGS. 5 and 6, an example is shown in which manifolds for gas supply and discharge are attached to the outside of the stack 12 according to the first embodiment of the invention. This type of gas supply and discharge is generally called an external manifold type. On the other hand, there is a SOFC called an internal manifold type in which the stack comprises the said manifold function. In this case, through-holes are provided in the interconnectors and the power generation films as a means to cause gases to flow in the direction perpendicular to the superposed layers, and the interconnectors and the power generation films are superposed alternately to form a unified structure in which a space having the same function as manifolds is formed inside the stack.

To explain a SOFC according to the third embodiment, an example will be hereunder described in which the present invention is applied to the above-mentioned SOFC of the internal manifold type.

FIGS. 13 and 14 are schematic views showing unit cells according to the third embodiment of the invention, corresponding to the schematic views of the unit cells of the external manifold type as explained in FIGS. 3 and 4 in the first embodiment. Reference numerals in FIGS. 13, 14 correspond to those in FIGS. 3 and 4, and their basic structures and functions are the same.

On the fuel electrode side of one of the four sides of the rectangular power generation films 2a and 2b, a fuel inlet aperture 45 is provided over nearly the entire length thereof, whereas on the air electrode side of one of the remaining two sides air inlet apertures 43a, 43b are provided in about that half of the said side which is closer to the fuel inlet aperture, and air outlet apertures 44a, 44b are provided in about that half of the side which is closer to the fuel gas outlet aperture, the said side facing the side with the air outlet apertures 43a, 43b.

The difference between this embodiment and the first embodiment in FIGS. 3 and 4 is that six through-holes are provided in the interconnectors 1 and the power generation films 2a, 2b. Reference numerals 61a and 61b in FIGS. 13 and 14 denote air supply holes; 62a and 62b, air outlet holes; 63, a fuel inlet hole; 64, a fuel gas outlet holes.

In the power generation film 2a shown in FIG. 13, the air supply hole 61a and the air inlet aperture 43a are connected with each other on the oxygen electrode side, whereas the air outlet hole 62a and the air outlet aperture 44a are connected with each other. The circumference of the other through-holes 61b, 62b, 63, and 64 is surrounded and insulated by the seal material 3, so that no gas can invade the oxygen electrode 23 of the power generation film 2a.

The air which is supplied from the air supply hole 61a to the air inlet aperture 43a is surrounded by the seal material 3 so as to pass the oxygen electrode surface 23, going through the air outlet aperture 44a, and is discharged to the air outlet hole 62a. Similarly, in the power generation film 2b shown in FIG. 14, the air which is supplied from the air supply hole 61b to the air inlet aperture 43b is surrounded by the seal material 3 so as to pass the oxygen electrode surface 23, going through the air outlet aperture 44b, and is discharged to the air outlet hole 62b.

The interconnectors and the power generation films comprising the above features are superposed alternately to form a unified fuel cell 14 (hereinafter stack 14), wherein the power generation films are also superposed alternately in a sequence 2a, 2b, 2a, 2b, etc.

In the stack 14 thus constituted, through-holes provided in each interconnector and each power generation film are superposed in the direction perpendicular to the layers to form manifolds inside the stack. In such a manner, a SOFC which is equivalent to the SOFC of the extrernal manifold type in the first embodiment in FIG. 5 in terms of structure and functions is realized. Also, in a horizontal arrangement in which the fuel gas outlet aperture 46 in the stack 14 of the third embodiment is placed toward an upward direction and the fuel gas inlet aperture 45 toward a downward direction, a SOFC equivalent in terms of structure and functions to the SOFC of the external manifold type shown in FIG. 6 can be realized.

The stack 14 in the SOFC of the internal manifold type which is constituted by superposing the interconnectors and the power generation films shown in FIG. 11 alternately is equivalent in terms of structure and functions to the SOFC shown in FIGS. 3 and 6 in which manifolds are provided externally as in the first embodiment of the invention. As a result, an effect similar to that explained in the first embodiment can be obtained in the third embodiment as well, thus providing a compact and economical SOFC.

In the third embodiment of the invention as in FIGS. 11, 12, 13, and 14, the upper surface of the power generation films 2a, 2b are the oxygen electrode, and the lower surface thereof the fuel electrode. However, the upper side and the lower side may be reversed. Also, in a SOFC of the internal manifold type constituted by replacing the oxygen electrode side and the fuel electrode side completely to comprise two kinds of gas fuel passages and one kind of air passage, an effect similar to that explained in the first embodiment can be obtained, as an example of the third embodiment of the invention.

Furthermore, in the interconnectors and the power generation films shown in FIGS. 7, 8(*a*), 8(*b*), 9(*a*), (*b*), (*c*), (*d*), and 10, similar to the manner explained in FIG. 11, a stack of the internal manifold type having a structure and a function equivalent to that of a SOFC of the invention can be obtained by providing 6 through-holes in the circumference. It is also possible to use the ascending flow caused by the buoyancy of the heated gas by the horizontal arrangement in which the fuel gas outlet aperture faces upwards, thus incorporating excellent reliability and economy. In the third embodiment of the invention, an example is shown in which internal manifolds are applied to all the gas inlet and outlet apertures in 6 positions. However, if some of these are of the external manifold type, for example, the fuel gas side is of the external manifold type and the air side is of the internal manifold type, functions and effects of the present invention can be ensured by providing the interconnectors and the power generation films with air inlet and outlet through-holes in 4 positions, and superposing them alternately, etc.

[Embodiment 4]

Figure 23:
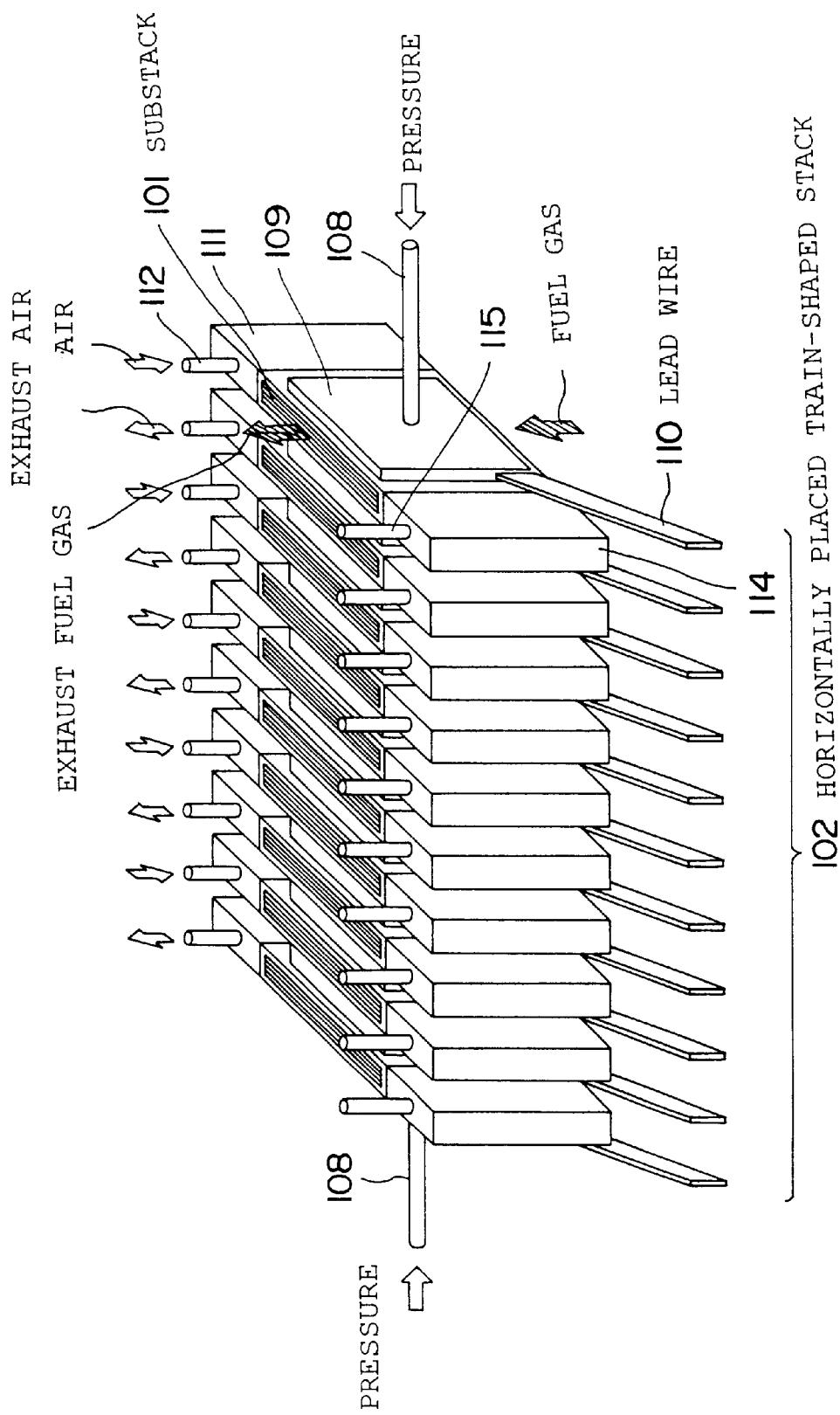
FIG. 23 is a simplified perspective view of a SOFC comprising substacks in the fourth embodiment of the present invention.
Figure 24:
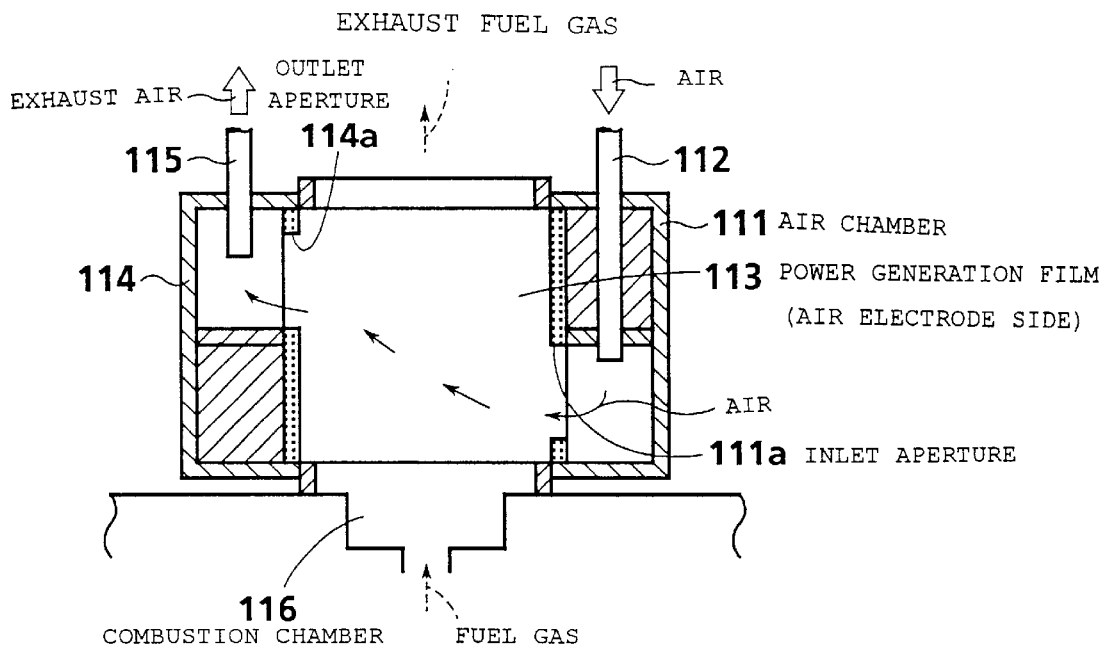
FIG. 24(a) a simplified view of a first air chamber in the fourth embodiment.
FIG. 24(b) is a simplified view of a second air chamber in the same embodiment.
Figure 24:
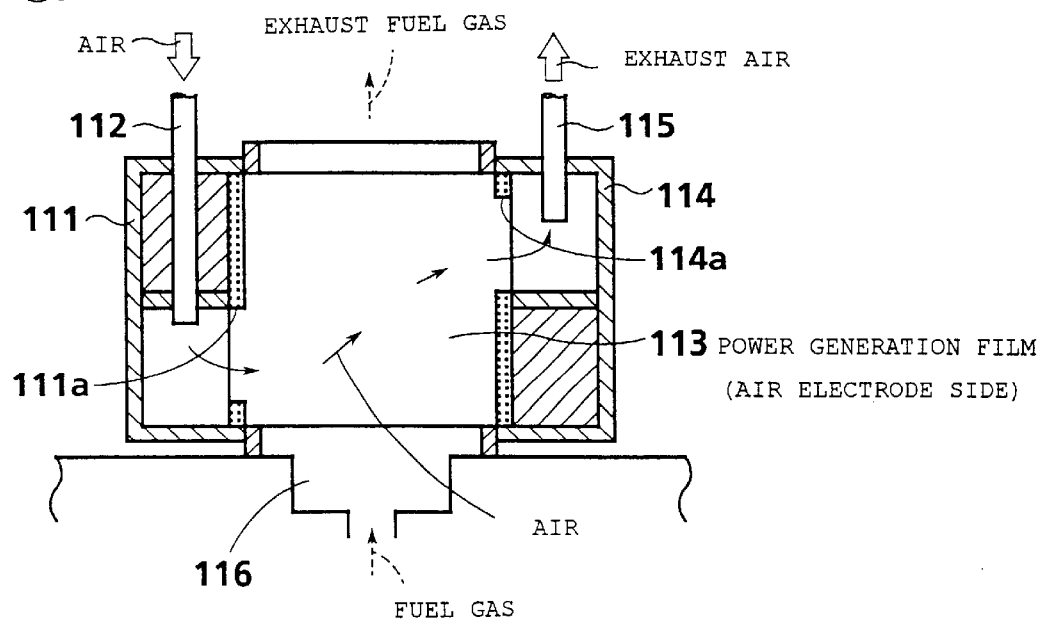

FIG. 23 is a simplified drawing of a planar type solid electrolyte fuel cell (SOFC) according to the fourth embodiment of the invention. FIG. 24(*a*) is a sectional view of the major part of an air chamber of the fourth embodiment. FIG. 24(*b*) is a sectional view of another air chamber of the fourth embodiment.

This embodiment is a variation of the horizontally placed fuel cell in the first embodiment shown in FIG. 6, wherein a substack as a unit is composed of multiple rows of vertically arranged power generation films with interconnectors sandwiched in-between, and ten such substacks 101 are connected like a freight train using intermediate current collector parts to form a horizontally placed stack train 102, thus constituting a horizontally placed SOFC.

The first substack and the tenth substack at both ends of the horizontally placed stack train 102 are with equipped each a current collector plate 109 comprising a current collector bar 108 in order to collect current. The horizontally placed stack train 102 is contained in a fuel cell chamber which is not shown in the drawing in a state in which the current collector bars 108 are pressurized from both ends.

In the present embodiment, the current collector part which is not shown in the drawing comprises lead wires 110 for current bypass in FIG. 23. For the lead wires 110, cables which are composed of nickel wires or plates can be used. Even if lead wires 110 are used, there is no danger of the said lead wires being oxidized, because the inside of the substack containers is situated lower than the environment in which reduction by fuel outlet gases can occur.

The lead wires 110 can be used to measure the voltage of the substacks constantly so that a bypass circuit can be formed as soon as any of the substacks fails, thus making it possible to prevent the other substacks that still function properly from being deteriorated, and improve the reliability of the cell operation.

In this horizontally placed fuel cell, each substack comprises a gas supply chamber. In FIG. 23, air chambers are provided on both sides, and fuel chambers are placed on the lower side of the stack, so that the gas is supplied from the lower part to the upper part. In the present embodiment, the fuel chambers are omitted in the drawing.

In each of the above substacks 101, a multiple number of (e.g. ten) power generation films are connected with interconnectors sandwiched in-between, and, for example, ten such substacks are placed in a row to form a fuel cell. In the present embodiment, the air flow of the first, third, fifth, seventh and ninth substacks and the air flow of the second, fourth, sixth, eighth and tenth substacks are exchanged with each other on a substack basis.

The air flow of the substacks on the air electrode side is illustrated in FIG. 24. FIG. 24(*a*) shows the air flow of the first, third, fifth, seventh and ninth substacks, and FIG. 24(*b*) the air flow of the second, fourth, sixth, eighth and tenth substacks in FIG. 23, respectively.

In the case illustrated in FIG. 24(*a*), the air from the air inlet pipe 112 is introduced inside from the air inlet aperture 111a having an opening provided in about the lower half of the right side in the drawing, and the air thus introduced is gradually warmed by the cell reaction and flows up diagonally upwards along the air electrode surface of the power generation film 113, whereas the exhaust air is discharged from the air outlet aperture 114a having an opening in about the upper half of the left side of the drawing and through the air outlet pipe 115. The fuel gas, on the other hand, is supplied from the fuel combustion chamber 116 placed in the lower part of the stack.

In the case shown in FIG. 24(b), the air from the air inlet pipe 112 is introduced inside from the air inlet aperture 111a having an opening in about the lower half of the left side in the drawing, and the air thus introduced is gradually warmed by the cell reaction and flows up diagonally upwards along the air electrode surface of the power generation film 113, whereas the exhaust air is discharged from the air outlet aperture 114a having an opening in about the upper half of the right side in the drawing and through the air outlet pipe 115. The fuel gas, on the other hand, is supplied from the fuel chamber 116 placed in the lower part of the stack.

Although the temperature distribution is asymmetric in each individual substack as shown in FIG. 19, substacks having opposite air supply directions can be combined with each other to realize a uniform temperature distribution in the fuel cell as a whole, and as a result, the heat stress is comparable with that of a co-flow type, thus ensuring reliable cell characteristics.

In summary, in the horizontally placed fuel cell in FIG. 23, similar to the horizontally placed fuel cell of the present invention shown in FIG. 6, the gas flow passages are so constituted that the air and the gas are guided from bottom to top, being warmed by the heat generated by the cell reaction, wherein the air and the gas thus heated decrease in specific weight and cause buoyancy which makes the gas flow from bottom to top smoother as compared with the vertically placed arrangement shown in FIG. 1.

This means that also the horizontally placed SOFC in FIG. 23, as compared with the vertically placed SOFC of the laminated type shown in FIG. 5, the temperature difference between the gas inlet aperture and the outlet aperture in the cell can be decreased, thereby reducing the heat stress, thus providing a highly reliable SOFC, while keeping the energy required for gas supply at a low level to offer an economical SOFC.

In the substacks in FIG. 23 described above, the air is supplied alternately in each individual stack. However, it is also possible to introduce the air alternately in each individual power generation film within one substack, so as to realize amore uniform temperature distribution.

Figure 25:
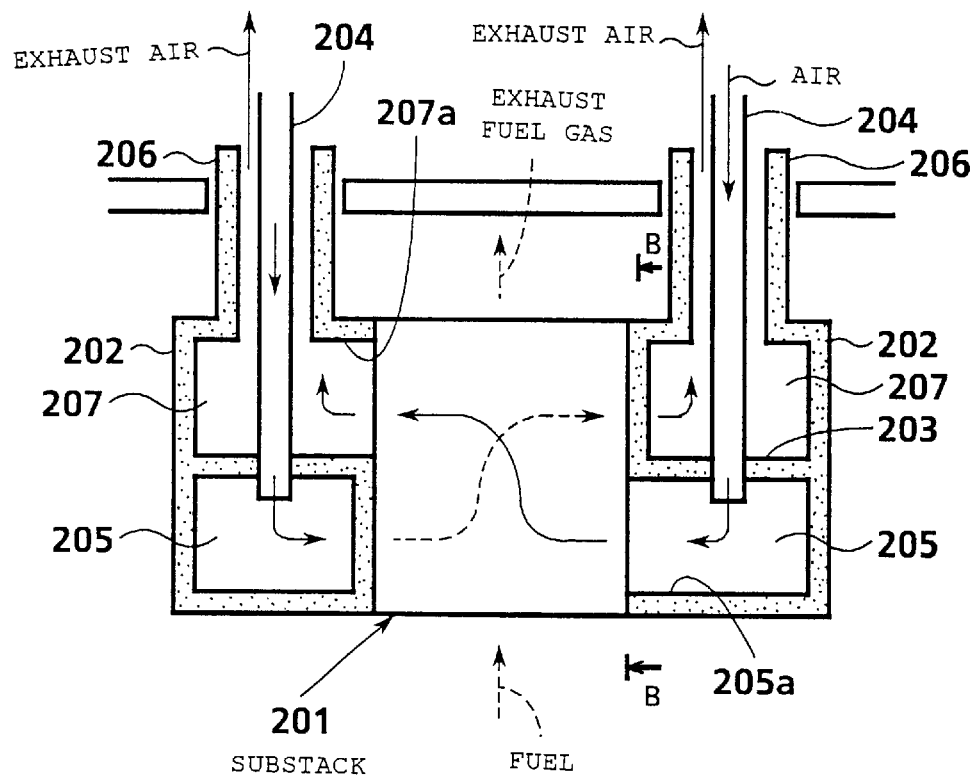
FIG. 25(a) is simplified view of a third air chamber in the fourth embodiment.
FIG. 25(b) shows a configuration of air inlet apertures and an outlet apertures.
Figure 25:
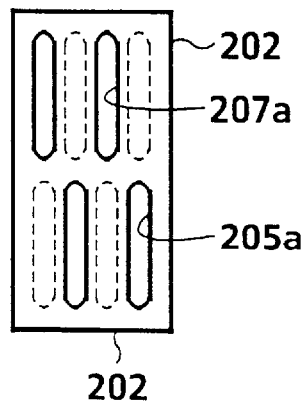

FIG. 25 illustrates an example in which the air is introduced alternately to the air electrodes in each individual substack.

In the example shown in FIG. 25(a), four power generation films are alternately sandwiched via interconnectors 1, whereas unified air supply chambers are provided on both sides to constitute a stack 201.

The air chambers 202 on both sides are each divided into the upper and the lower chamber by the separation wall 203, wherein the air supply pipe 204 is connected to the lower chamber 205 and the air outlet pipe 206 connected to the upper air chamber 207, and the air inlet apertures 205a having an opening about half the size of the fuel supply side are placed alternately in a row to supply air alternately from the left and from the right, whereas the air is discharged alternately through the outlet apertures 207a which are located diagonally upper left to the air inlet apertures and have each an opening of about half the fuel outlet side, so that the temperature distribution becomes uniform within each individual stack, thus activating the cell reaction. In this case, the heat of the discharged air can be used to warm the supplied air without any special equipment because the air is supplied and discharged through double pipes, thus adding the function of a heat exchanger easily to the part of the embodiment. Similarly, in an embodiment in which the fuel is supplied and discharged through double pipes, the oxygen electrode side and the fuel electrode side can be replaced completely with each other to add the function of a heat exchanger easily, wherein it is also possible to realize a gas reforming function readily and at a low cost in a limited space by providing a catalyst layer in the gas supply pipes, if, for example, town gas is used as the fuel for cells.

As explained above, the air chambers that serve as manifolds for air supply can be made smaller by limiting the number of power generation films which constitute the substacks. Furthermore, by connecting a plurality of such substacks, a uniform temperature distribution in the whole fuel cell can be realized, thus limiting the heat stress to the level which is equivalent or superior to that by the co-flow method, ensuring reliable cell characteristics.

In contrast to the cases in which several dozens of stacks are placed next to or upon one another, manifolds and other components according to the present invention need not be large-sized, thus improving the sealing capability as well as reducing the manufacturing cost of the fuel cells.

INDUSTRIAL APPLICABILITY

As described above, the present invention provides a compact and economical solid electrolyte fuel cell in which the generated heat stress is small to ensure reliable characteristics of the fuel cell and the structure is simple as by the cross flow method to provide a wide power generation area.

What is claimed is:

1. A solid oxide electrolyte fuel cell, comprising:

a planar power generation film including a solid electrolyte layer, an oxygen electrode formed on a first surface of the solid electrolyte layer, and a fuel electrode formed on a second surface of the solid electrolyte layer, said film having a pair of first opposing sides and a pair of second opposing sides substantially perpendicular to the first opposing sides;

a first interconnector facing the fuel electrode and forming a first space between one side the first interconnector and the fuel electrode;

a second interconnector facing the oxygen electrode and forming a second space between one side of the second interconnector and the oxygen electrode;

a fuel gas inlet aperture for supplying fuel gas into the first space, the fuel gas inlet aperture being provided in a vicinity of the one of the first opposing sides of the power generation film between the first interconnector and the fuel electrode substantially along an entire length of the one of first opposing sides;

a fuel gas outlet aperture for exhausting the fuel gas from the first space, the fuel gas outlet aperture being provided in a vicinity of another of the first opposing sides of the power generation film between the first interconnector and the fuel electrode substantially along an entire length of the another of the first opposing sides;

an air inlet aperture for providing oxidant gas into the second space, the air inlet aperture being provided in a vicinity of the one of the second opposing sides of the power generation film between the second interconnector and the oxygen electrode and having about half a length of one of the second opposing sides at a position adjacent the fuel gas inlet aperture; and an air outlet aperture for exhausting the oxidant gas from the second space, the air outlet aperture being provided in a vicinity of another of the second opposing sides of the power generation film between the second interconnector and the oxygen electrode and having about half a length of the another of the second opposing sides at a position adjacent the first fuel outlet aperture.

2. The solid electrolyte fuel cell according to claim 1, wherein said power generation film is a solid electrolyte including a plurality of dimples.

3. The solid oxide fuel cell according to claim 1, further comprising:

a first seal material provided between the peripheral portion of the power generation film between the first interconnector and the fuel electrode, and defines the gas fuel inlet aperture and the gas fuel outlet aperture; and a second seal material provided between the peripheral portion of the power generation film between the second interconnector and the air electrode, and defines the air inlet aperture and the air outlet aperture.

4. The solid electrolyte fuel cell according to claim 1, wherein said first interconnector includes a first circumferential wall protruding towards the power generation film and defining the gas fuel inlet aperture and the gas fuel outlet aperture, and said second interconnector includes a second circumferential wall protruding towards the power generation film and defining the air inlet aperture and the air outlet aperture.

5. The solid electrolyte fuel cell according to claim 4, wherein said first interconnector includes a plurality of first protrusions forming a plurality of grooves in the one side of the first interconnector, and said second interconnector includes a plurality of second protrusions forming a plurality of second grooves in the one side of the second interconnector.

6. The solid electrolyte fuel cell according to claim 1, wherein the solid electrolyte fuel cell is placed such that said gas inlet aperture is lower than said gas outlet aperture.

7. The solid electrolyte fuel cell according to claim 1, wherein at least one of said air inlet aperture, said air outlet aperture, said fuel gas inlet aperture, and said fuel gas outlet aperture is a manifold provided in the planar power generation film.

8. A solid oxide electrolyte fuel cell, comprising:

a first cell having a pair of first opposing sides and a pair of second opposing sides substantially perpendicular to the first opposing sides, said first cell including, a first planar power generation film including a first solid electrolyte layer, a first fuel electrode formed on a first surface of the first solid electrolyte layer, and a first air electrode formed on a second surface of the first solid electrolyte layer, a first interconnector facing the first fuel electrode and forming a first space between one side the first inter connector and the first fuel electrode, a first fuel gas inlet aperture for supplying fuel gas into the first space, the first fuel gas inlet aperture being provided in a vicinity of the one of the first opposing sides of the first cell between the first interconnector and the first fuel electrode substantially along an entire length of the one of first opposing sides, a first fuel gas outlet aperture for exhausting the fuel gas from the first space, the first fuel gas outlet aperture being provided in a vicinity of another of the first opposing sides of the first cell between the first interconnector and the first fuel electrode substantially along an entire length of the another of the first opposing sides, a second interconnector facing the first air electrode and forming a second space between one side of the second interconnector and the first air electrode, a first air inlet aperture for providing oxidant gas into the second space, the first air inlet aperture being provided in a vicinity of the one of the second opposing sides of the first cell between the second interconnector and the first oxygen electrode and having about half a length of the one of the second opposing sides at a position adjacent the first fuel gas inlet aperture, a first air outlet aperture for exhausting the oxidant gas from the second space, the first air outlet aperture being provided in a vicinity of the another of the second opposing sides of the first cell between the second interconnector and the first oxygen electrode and having about half a length of the another of the second opposing sides adjacent the first fuel outlet aperture; and, a second cell provided adjacent the first cell and having the pair of first opposing sides and the pair of second opposing, said second cell including, a second planar power generation film including a second solid electrolyte layer, a second oxygen electrode formed on a first surface of the second solid electrolyte layer, and a second fuel electrode formed on a second surface of the second solid electrolyte layer, a third space formed between another side of the second interconnector and the second fuel electrode, a second fuel gas inlet aperture for supplying the fuel gas into the third space, the second fuel gas inlet aperture being provided in a vicinity of the one of the first opposing sides of the second cell between the second interconnector and the second fuel electrode substantially along an entire length of the one of first opposing sides, a second fuel gas outlet aperture for exhausting the fuel gas from the third space, the second fuel gas outlet aperture being provided in a vicinity of another of the first opposing sides of the second cell between the second interconnector and the second fuel electrode substantially along an entire length of the another of the first opposing sides, a third interconnector facing the second air electrode and forming a fourth space between one side of the third interconnector and the second air electrode, a second air inlet aperture for providing the oxidant gas into the fourth space, the second air inlet aperture being provided in a vicinity of the another of the second opposing sides of the second cell between the third interconnector and the second oxygen electrode and having about half a length of the another of the second opposing sides at a position adjacent the second fuel gas inlet aperture, and a second air outlet aperture for exhausting the oxidant gas from the fourth space, the second air outlet aperture being provided in a vicinity of the one of the second opposing sides of the second cell between the third interconnector and the second oxygen electrode and having about half a length of the one of the second opposing sides adjacent the second fuel outlet aperture.

9. The solid electrolyte fuel cell according to claim 8, wherein said first and second power generation films are a solid electrolyte including a plurality of dimples.

10. The solid electrolyte fuel cell according to claim 8, wherein the first and second cells are placed such that the first and second gas inlet apertures are lower than the first and second gas outlet apertures.

11. The solid electrolyte fuel cell according to claim 8, wherein the solid electrolyte fuel cell includes a plurality of first and second cells that are stacked together such that the first cells and the second cells are alternately provided.

12. The solid electrolyte fuel cell according to claim 8, wherein the first and second gas inlet apertures are manifolds provided in the first and second planar power generation films, respectively.

13. The solid electrolyte fuel cell according to claim 8, wherein the first and second gas outlet apertures are manifolds provided in the first and second planar power generation films, respectively.

14. A solid oxide electrolyte fuel cell, comprising:

a planar power generation film including a first electrode and a second electrode and second electrodes, said film having a pair of first opposing sides and a pair of second opposing sides substantially perpendicular to the first opposing sides;

a first interconnector facing the first electrode and forming a first space between one side the first interconnector and the first electrode;

a second interconnector facing the second electrode and forming a second space between one side of the second interconnector and the second electrode;

a first gas inlet aperture for supplying a first gas into the first space, the first gas inlet aperture being provided in a vicinity of the one of the opposing sides of the power generation film between the first interconnector and the first electrode substantially along an entire length of the one of first opposing sides;

a first gas outlet aperture for exhausting the first gas from the first space, the first gas outlet aperture being provided in a vicinity of another of the first opposing sides of the power generation film between the first interconnector and the first electrode substantially along an entire length of the another of the first opposing sides;

a second gas inlet aperture for providing a second gas into the second space, the second gas inlet aperture being provided in a vicinity of the one of the second opposing sides of the power generation film between the second interconnector and the second electrode and having about half a length of one of the second opposing sides at a position adjacent the first gas inlet aperture; and an second gas outlet aperture for exhausting the second gas from the second space, the second gas outlet aperture being provided in a vicinity of another of the second opposing sides of the power generation film between the second interconnector and the second electrode and having about half a length of the another of the second opposing sides at a position adjacent the first gas outlet aperture.

* * * * *

UNITED STATES PATENT AND TRADEMARK OFFICE
CERTIFICATE OF CORRECTION

PATENT NO. : 6,296,963 B1
DATED : October 2, 2001
INVENTOR(S) : Fusayuki Nanjo

It is certified that error appears in the above-identified patent and that said Letters Patent is hereby corrected as shown below:

<u>Title page,</u>
Item [86], PCT No.: please correct both the § 371 Date and the § 102(e) Date form "Jul. 13, 2000" to -- Jul. 13, 1999 --.

Signed and Sealed this

Thirtieth Day of July, 2002

*Attest:*

*Attesting Officer*

JAMES E. ROGAN
*Director of the United States Patent and Trademark Office*